United States Patent
Sagiyama et al.

(10) Patent No.: US 9,990,258 B2
(45) Date of Patent: Jun. 5, 2018

(54) MANAGEMENT COMPUTER AND MANAGEMENT PROGRAM

(71) Applicant: HITACHI, LTD., Tokyo (JP)

(72) Inventors: Tomoyuki Sagiyama, Tokyo (JP); Tomohito Uchida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 159 days.

(21) Appl. No.: 15/024,638

(22) PCT Filed: Jan. 31, 2014

(86) PCT No.: PCT/JP2014/052334
§ 371 (c)(1),
(2) Date: Mar. 24, 2016

(87) PCT Pub. No.: WO2015/114816
PCT Pub. Date: Aug. 6, 2015

(65) Prior Publication Data
US 2016/0239391 A1 Aug. 18, 2016

(51) Int. Cl.
*G06F 11/00* (2006.01)
*G06F 11/20* (2006.01)
(Continued)

(52) U.S. Cl.
CPC .............. *G06F 11/20* (2013.01); *G06F 9/46* (2013.01); *G06F 11/1484* (2013.01); *G06F 2201/805* (2013.01)

(58) Field of Classification Search
CPC ........ G06F 11/20; G06F 9/46; G06F 11/1484; G06F 2201/805
See application file for complete search history.

(56) References Cited

U.S. PATENT DOCUMENTS 6,728,746 B1 * 4/2004 Murase ................. G06F 9/4843
714/E11.003
7,240,234 B2 * 7/2007 Morita ................. G06F 11/2025
710/36

(Continued)

FOREIGN PATENT DOCUMENTS

JP 2003-330740 A 11/2003
JP 2011-258233 A 12/2011

(Continued)

*Primary Examiner* — Bryce P Bonzo
*Assistant Examiner* — Jonathan D Gibson
(74) *Attorney, Agent, or Firm* — Volpe and Koenig, P.C.

(57) ABSTRACT

In a management computer, a memory stores: association information indicating an association among a first physical computer, a virtual computer that is implemented by the first physical computer, a first physical resource that is allocated to the virtual computer, and a user who uses the virtual computer; failure information indicating a failed physical resource; and an upper limit value for a destruction amount as an amount of a physical resource that has failed by being used by the user. A processor calculates the destruction amount, and transmits, upon determining that the first physical resource has failed, that the destruction amount is equal to or less than the upper limit value, and that any of a plurality of physical computers includes the second physical resource, to the first physical computer an instruction to allocate a second physical resource as a replacement for the first physical resource to the virtual computer.

13 Claims, 19 Drawing Sheets

(51) Int. Cl.
    *G06F 9/46*         (2006.01)
    *G06F 11/14*      (2006.01)

(56) References Cited

U.S. PATENT DOCUMENTS

| | | | |
|---|---|---|---|
| 9,262,289 B2 * | 2/2016 | Gomi | G06F 11/20 |
| 2003/0217088 A1 * | 11/2003 | Takamoto | G06F 11/2025 718/1 |
| 2006/0143498 A1 * | 6/2006 | Hatasaki | G06F 11/2025 714/6.32 |
| 2007/0011495 A1 * | 1/2007 | Armstrong | G06F 11/2033 714/39 |
| 2008/0133963 A1 * | 6/2008 | Katano | G06F 11/0712 714/4.1 |
| 2010/0094928 A1 * | 4/2010 | Nakamura | H04L 67/125 709/203 |
| 2010/0095149 A1 * | 4/2010 | Lee | G06F 11/1666 714/6.13 |
| 2010/0325345 A1 | 12/2010 | Ohno et al. | |
| 2012/0179932 A1 * | 7/2012 | Armstrong | G06F 11/20 714/4.11 |
| 2014/0059380 A1 * | 2/2014 | Krishnan | G06F 11/1415 714/15 |

FOREIGN PATENT DOCUMENTS

| | | | |
|---|---|---|---|
| WO | 2011/074284 A1 | 6/2011 | |
| WO | 2011/138879 A1 | 11/2011 | |

\* cited by examiner

Fig. 5

Server configuration information 650

| Physical server ID | Logical partitioning mechanism ID | Held resource information | | | | | |
|---|---|---|---|---|---|---|---|
| | | Resource type | Resource ID | Resource amount | Resource state | In-use information | Occupied/ Shared |
| Physical server (1) | Logical partitioning mechanism (1) | CPU | CPU1-1 | 8Core | Normal | Yes | Shared |
| | | | CPU1-2 | 8Core | Normal | Yes | Shared |
| | | | CPU1-3 | 8Core | Failed | No | Shared |
| | | Memory | MEM1-1 | 4GB | Normal | Yes | Occupied |
| | | | MEM1-2 | 4GB | Normal | Yes | Occupied |
| | | | MEM1-3 | 4GB | Normal | No | Occupied |
| | | Flash device | Flash1-1 | 300GB | Failed | No | Shared |
| | | | Flash1-2 | 300GB | Normal | Yes | Shared |
| | | | Flash1-3 | 300GB | Normal | No | Shared |
| | | NIC | MAC1-1 | n/a | Normal | Yes | Shared |
| | | | MAC1-2 | n/a | Normal | Yes | Shared |
| | | HBA | WWN1-1 | n/a | Normal | Yes | Shared |
| | | | WWN1-2 | n/a | Normal | Yes | Shared |
| Physical server (2) | Logical partitioning mechanism (2) | CPU | CPU2-1 | 8Core | Normal | Yes | Shared |
| | | | CPU2-2 | 8Core | Normal | Yes | Shared |
| | | Memory | MEM2-1 | 4GB | Normal | Yes | Occupied |
| | | | MEM2-2 | 4GB | Normal | Yes | Occupied |
| | | Flash device | Flash2-1 | 300GB | Normal | Yes | Shared |
| | | | Flash2-2 | 300GB | Normal | Yes | Shared |
| | | NIC | MAC2-1 | n/a | Normal | Yes | Shared |
| | | | MAC2-2 | n/a | Normal | Yes | Shared |
| | | HBA | WWN2-1 | n/a | Normal | Yes | Shared |
| | | | WWN2-2 | n/a | Normal | Yes | Shared |

Fig. 6

LPAR configuration information 660

| LPAR-ID | Logical partitioning mechanism ID | LPAR operating state | Allocated resource information | | |
|---|---|---|---|---|---|
| | | | Resource type | Resource ID | Resource amount |
| LPAR-A1 | Logical partitioning mechanism (1) | In operation | CPU | CPU1-1 | 2Core |
| | | | Memory | MEM1-1 | 4GB |
| | | | Flash device | Flash1-2 | 100GB |
| | | | NIC | MAC1-1 | 1 |
| | | | HBA | WWN1-1 | 1 |
| LPAR-A2 | Logical partitioning mechanism (2) | In operation | CPU | CPU2-1 | 2Core |
| | | | Memory | MEM2-1 | 4GB |
| | | | Flash device | Flash2-1 | 100GB |
| | | | NIC | MAC2-1 | 1 |
| | | | HBA | WWN2-1 | 1 |
| LPAR-B1 | Logical partitioning mechanism (1) | In operation | CPU | CPU1-2 | 2Core |
| | | | Memory | MEM1-2 | 4GB |
| | | | Flash device | Flash1-2 | 100GB |
| | | | NIC | MAC1-2 | 1 |
| | | | HBA | WWN1-2 | 1 |
| LPAR-B2 | Logical partitioning mechanism (2) | In operation | CPU | CPU2-2 | 2Core |
| | | | Memory | MEM2-2 | 4GB |
| | | | Flash device | Flash2-2 | 100GB |
| | | | NIC | MAC2-2 | 1 |
| | | | HBA | WWN2-2 | 1 |

Fig. 7

Tenant association
information 670

| Tenant ID | Used LPAR-ID | Hypervisor |
|---|---|---|
| Tenant A | LPAR-A1 | Yes |
| | LPAR-A2 | Yes |
| Tenant B | LPAR-B1 | Yes |
| | LPAR-B2 | Yes |

Destruction amount upper limit value information 680

| Tenant ID | Resource type | Destruction amount upper limit value | Upper limit value exceeding |
|---|---|---|---|
| Tenant A | CPU | 8Core | No |
| | Memory | 16GB | No |
| | Flash device | 300GB | Yes |
| | NIC | 3 | No |
| | HBA | 3 | No |
| Tenant B | CPU | 8Core | No |
| | Memory | 16GB | No |
| | Flash device | 300GB | No |
| | NIC | 3 | No |
| | HBA | 3 | No |

Fig. 9

Resource use history information 690

| Resource ID | Used Tenant | Used LPAR | Use history | Allocated amount |
|---|---|---|---|---|
| Flash1-1 | Tenant A | LPAR-A1 | Write: 8000 times | 100GB |
| | | LPAR-A2 | Write: 1000 times | 100GB |
| | Tenant B | LPAR-B1 | Write: 1000 times | 100GB |
| Flash1-2 | Tenant A | LPAR-A1 | Write: 8000 times | 100GB |
| | Tenant B | LPAR-B1 | Write: 2000 times | 100GB |
| Flash2-1 | Tenant A | LPAR-A2 | Write: 7000 times | 100GB |
| Flash2-2 | Tenant B | LPAR-B2 | Write: 6000 times | 100GB |
| CPU1-3 | Tenant A | LPAR-A1 | 0.25Core | 0.25Core |
| | Tenant B | LPAR-B1 | 0.25Core | 0.25Core |
| | | LPAR-B2 | 0.25Core | 0.25Core |
| | | LPAR-B3 | 0.25Core | 0.25Core |

Resource state input screen

| # | Resource ▼ | Allocation destination LPAR | LPAR operating state | Physical server | Resource state |
|---|---|---|---|---|---|
| ☐ | CPU1-1 | LPAR-A1 | In operation | Physical server (1) | Normal |
| ☐ | CPU1-2 | LPAR-B1 | In operation | Physical server (1) | Normal |
| ☐ | MEM1-1 | LPAR-A1 | In operation | Physical server (1) | Normal |
| ☐ | MEM1-2 | LPAR-B1 | In operation | Physical server (1) | Normal |
| ☐ | Flash1-1 | LPAR-A1 | Standby | Physical server (1) | Failed |
| ☐ | Flash1-2 | LPAR-A1,LPARB1 | In operation | Physical server (1) | Normal |
| ☑ | Flash1-3 | LPAR-A2,LPARB2 | In operation | Physical server (1) | Failed (manual) |
| ☐ | NIC1-1 | LPAR-A1 | In operation | Physical server (1) | Normal |
| ☐ | NIC1-2 | LPAR-B1 | Standby | Physical server (1) | Failed (manual) |
| ☐ | HBA1-1 | LPAR-A1 | In operation | Physical server (1) | Normal |
| : | : | : | : | : | : |

721 — Set as failed resource    Recover from failed resource

723 — ☑ Immediately execute allocation cancelation (reallocation execution) (Restart LPAR as needed)

Fig. 19

Destruction amount upper limit value input screen

| Tenant ID | Resource type | Destruction amount upper limit value | |
|---|---|---|---|
| | | Set value | Unit |
| Tenant A | CPU | 8 | Core |
| | Memory | 16 | GB ▼ |
| | Flash device | 300 | GB ▼ |
| | NIC | 3 | pieces |
| | HBA | 3 | pieces |
| Tenant B | CPU | 8 | Core |
| | Memory | 16 | GB ▼ |
| | Flash device | 300 | GB ▼ |
| | NIC | 3 | pieces |
| | HBA | 3 | pieces |

[ Apply ]  [ Cancel ]

MANAGEMENT COMPUTER AND MANAGEMENT PROGRAM

TECHNICAL FIELD

This invention is concerning a management computer that manages a computer.

BACKGROUND ART

A technique has been known in which a physical computer provides a virtual computer such as a LPAR (Logical Partition) and a VM (Virtual Machine).

PTL1 describes a technique in which a physical server establishes a plurality of LPARs, a management server identifies, when the physical server fails, an LPAR affected by the failure, and performs a failover of the identified LPAR only, so that implementation of the other LPARs can be continued.

CITATION LIST

Patent Literature

PTL 1

Japanese Patent Application Publication No. 2011-258233

SUMMARY OF INVENTION

Technical Problem

When a physical resource allocated to a virtual computer fails, and the virtual computer affected by the failure operates by using a new physical resource in place of the failed physical resource, the new physical resource might fail due to the operation of the virtual computer. Thus, other virtual computers might be affected by the failure.

Solution to Problem

To solve the problem described above, a management computer according to an aspect of the present invention includes a memory, a network interface coupled to a plurality of physical computers, and a processor coupled to the memory and the network interface. The memory is configured to: store association information indicating an association among a first physical computer that is in the plurality of physical computers, a virtual computer that is implemented by the first physical computer, a first physical resource that is in the first physical computer and allocated to the virtual computer, and a user who uses the virtual computer, store failure information indicating a failed physical resource, and store an upper limit value for a destruction amount being an amount of a physical resource that is of the same type as the first physical resource and that has failed by being used by the user. The processor is configured to: calculate the destruction amount based on the association information and the failure information, determine whether or not the destruction amount is equal to or less than the upper limit value, determines based on the failure information whether or not the first physical resource fails, determines, upon determining that the first physical resource fails and that the destruction amount is equal to or less than the upper limit value, based on the association information whether or not any of the plurality of physical computers includes a second physical resource that is usable as a replacement for the first physical resource, and transmits, upon determining that any of the plurality of physical computers includes the second physical resource, to the first physical computer an instruction to allocate the second physical resource as a replacement for the first physical resource to the virtual computer.

Advantageous Effects of Invention

An aspect of the present invention can prevent a virtual computer from excessively destructing a physical resource.

BRIEF DESCRIPTION OF DRAWINGS

FIG. 5 illustrates server configuration information 650.

FIG. 6 illustrates LPAR configuration information 660.

FIG. 7 illustrates tenant association information 670.

FIG. 8 illustrates destruction amount upper limit value information 680.

FIG. 9 illustrates resource use history information 690.

FIG. 17 illustrates a resource state input screen.

FIG. 19 illustrates a destruction amount upper limit value input screen.

DESCRIPTION OF EMBODIMENTS

Figure 1:
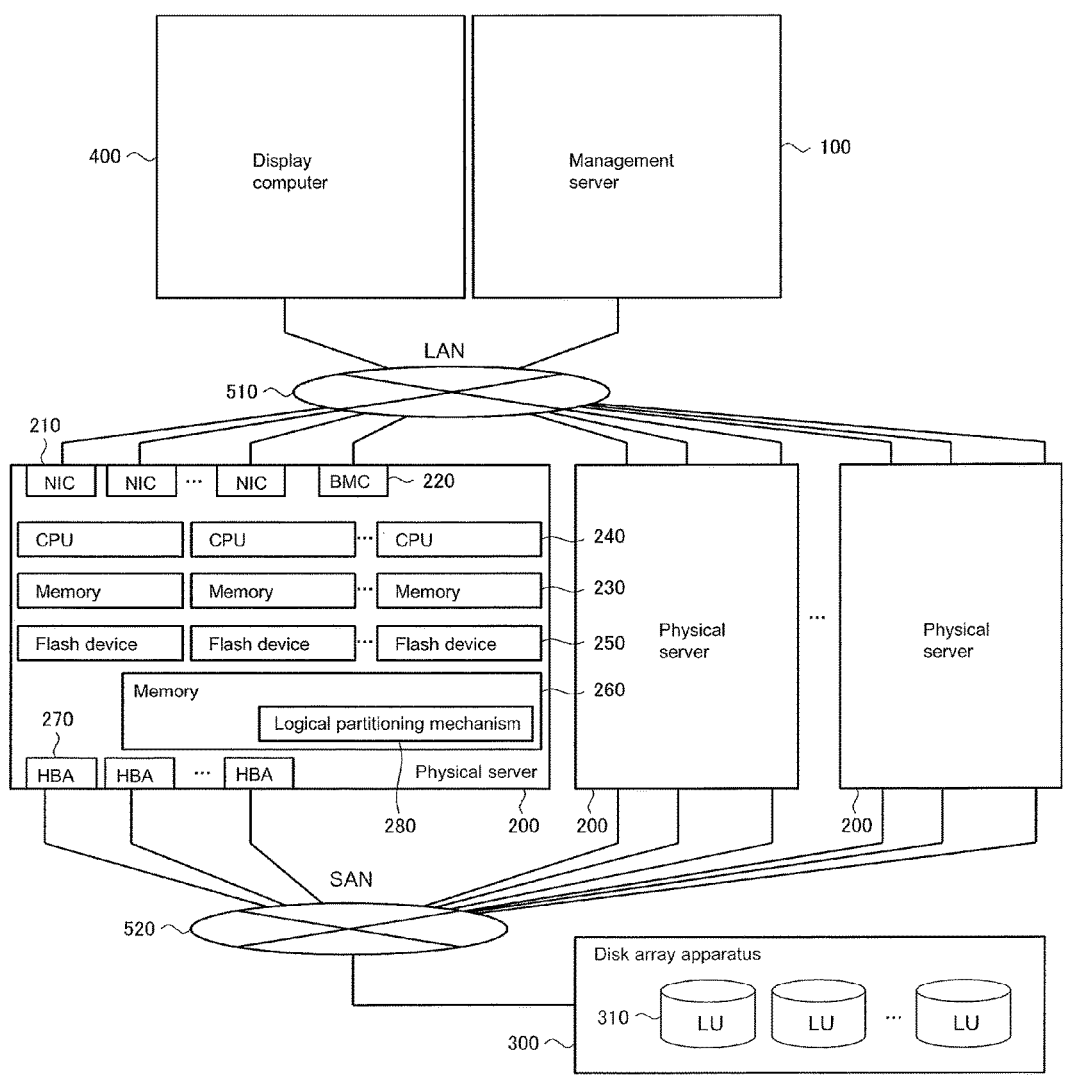
FIG. 1 illustrates a configuration of a computer system according to an embodiment of the present invention.

In the following description, pieces of information in the present invention are described as an "aaa table", "aaa list", "aaa DB", "aaa cue", or the like. However, the pieces of information may be described as a data structure other than tables, lists, DBs, cues, or the like. To show that the information does not depend on a data structure, the "aaa table", "aaa list", "aaa DB", "aaa cue", or the like may be referred to as "aaa information".

To describe the content of each piece of information, such phrases as "identification information", "identifier", "name", "surname", "ID" are used, which are interchangeable with each other.

In the following description, although a "program" may be a subject of performing processing, because the program is executed by a processor performing predetermined processing using a memory and a communication port (communication control device), the processor can be a subject of performing such processing. Furthermore, processing disclosed to be performed by a program may be processing performed by a computer such as a management computer or an information processing apparatus. At least part or all of the program may be executed by dedicated hardware.

The program may be installed in a computer through a program distribution server or computer-readable memory media. In this case, the program distribution server includes a CPU and a storage resource, and the storage resource stores a distribution program and programs to be distributed. By executing the distribution program, the CPU in the program distribution server distributes the programs to be distributed to other computers.

A management computer includes an input/output device. Examples of the input/output device may include, but are not limited to, a display device, a keyboard, and a pointer device. As an alternative example of the input/output device, a serial interface or an Ethernet (registered trademark) interface may be employed, and a display computer, including the display device, the keyboard, or the pointing device, may be coupled to the interface. The management computer may transmit displayed information to the display computer and receive input information from the display computer, whereby display can be implemented by the display computer, or input and display can be implemented in place of the input/output device by receiving the input.

In the following description, one computer or a group of computers that manage an information processing system and display the displayed information may be referred to as a management system. The management computer is a management system when the management computer displays displayed information. A combination of the management computer and the display computer is a management system. To achieve higher speed and higher reliability of management processing, a plurality of computers may execute processing that is identical or similar to that executed by the management computer. In such a case, the plurality of computers (including the display computer, when the display computer performs the displaying) are a management system.

Embodiments of the present invention will be described below with reference to the drawings.

In the present embodiment, a computer system is described that includes: a plurality of physical servers that provide a virtual computer, such as an LPAR and a VM, to a user; and a management server that manages the physical servers.

FIG. 1 illustrates a configuration of a computer system according to an embodiment of the present invention.

The computer system according to the present embodiment includes: a management server 100; a plurality of physical servers 200; a disk array apparatus 300; and a display computer 400. The management server 100, the plurality of physical servers 200, and the display computer 400 are coupled to each other through a LAN (Local Area Network) 510. The plurality of physical servers 200 and the disk array apparatus 300 are coupled to each other through a SAN (Storage Area Network) 520.

The disk array apparatus 300 includes a plurality of storage media such as an HDD (Hard Disk Drive) and a flash device, and provides a plurality of LUs (Logical Units) 310 to the physical servers 200 based on the storage media.

The physical server 200 includes: a plurality of NICs (Network Interface Cards) 210; a BMC (Base Management Controller) 220; a plurality of memories 230; a plurality of CPUs (Central Processing Units) 240; a plurality of flash devices 250; a memory 260; and a plurality of HBAs (Host Bus Adaptors) 270. The number of each of the NIC 210, the memory 230, the CPU 240, the flash devices 250, and the HBA 270 may be one. The flash device 250 is a storage device that includes a non-volatile semiconductor memory such as a flash memory as a storage medium. The flash device 250 degrades as the number of writings increase.

The NIC 210 is coupled to the LAN 510, and communicates with the management server 100. The BMC 220 is coupled to the LAN 510, and performs hardware monitoring, remote control, hardware event recording for the physical server 200. The memory 230 stores a program and data used for processing executed by the physical server 200. The CPU 240 executes processing based on the program and the data stored in the memory 230. The flash device 250 includes anon-volatile semiconductor memory such as a flash memory, and stores data. The memory 260 stores a program for a logical partitioning mechanism 280. The memory 260 may be a local storage such as an HDD and a flash device. The HBA 270 is coupled to the SAN 520 and communicates with the disk array apparatus 300.

The plurality of physical servers 200 provide a multi-tenant environment. The multi-tenant environment is an environment in which some physical servers 200 are shared among a plurality of organizations. An overall administrator of the multi-tenant environment has an administrator authority over the physical servers 200 providing the multi-tenant environment, and the resources (physical resources) of the multi-tenant environment as a whole. The tenant in the multi-tenant environment is a group of resources associated with an organization that uses the multi-tenant environment. The resource is a part of the physical resources, installed in the physical server 200, such as the CPU 240, the memory 230, the flash device 250, the NIC 210, and the HBA 270 in the physical server 200. A tenant user is a user having the administrator authority over the resource of the tenant. The LPAR is a partition created by logically partitioning the resource in the physical server 200. The logical partitioning mechanism 280 is firmware for establishing the LPAR on the physical server 200. In the present embodiment, the hypervisor operates on the LPAR. The hypervisor is a program that virtualizes the physical server 200 or the LPAR and thus implements a plurality of VMs in parallel. Each VM runs an OS (Operating System) and an application for businesses.

A state where a resource of the physical server 200 is physically damaged to be unavailable by the computer system is hereinafter referred to as failure. For example, the physical damage is overcurrent, overvoltage, overheating, and the like, in a case of the CPU 240, and is memory cell degradation due to excessive writing, in a case of the flash device 250. A case where the LPAR destroys the resource includes a failure of the CPU due to the heat generated by large load processing executed by the CPU 240 for a long period of time, a failure of the flash device 250 due to the memory cell degradation caused by the excessive writing to the flash devices 250, and the like.

Figure 2:
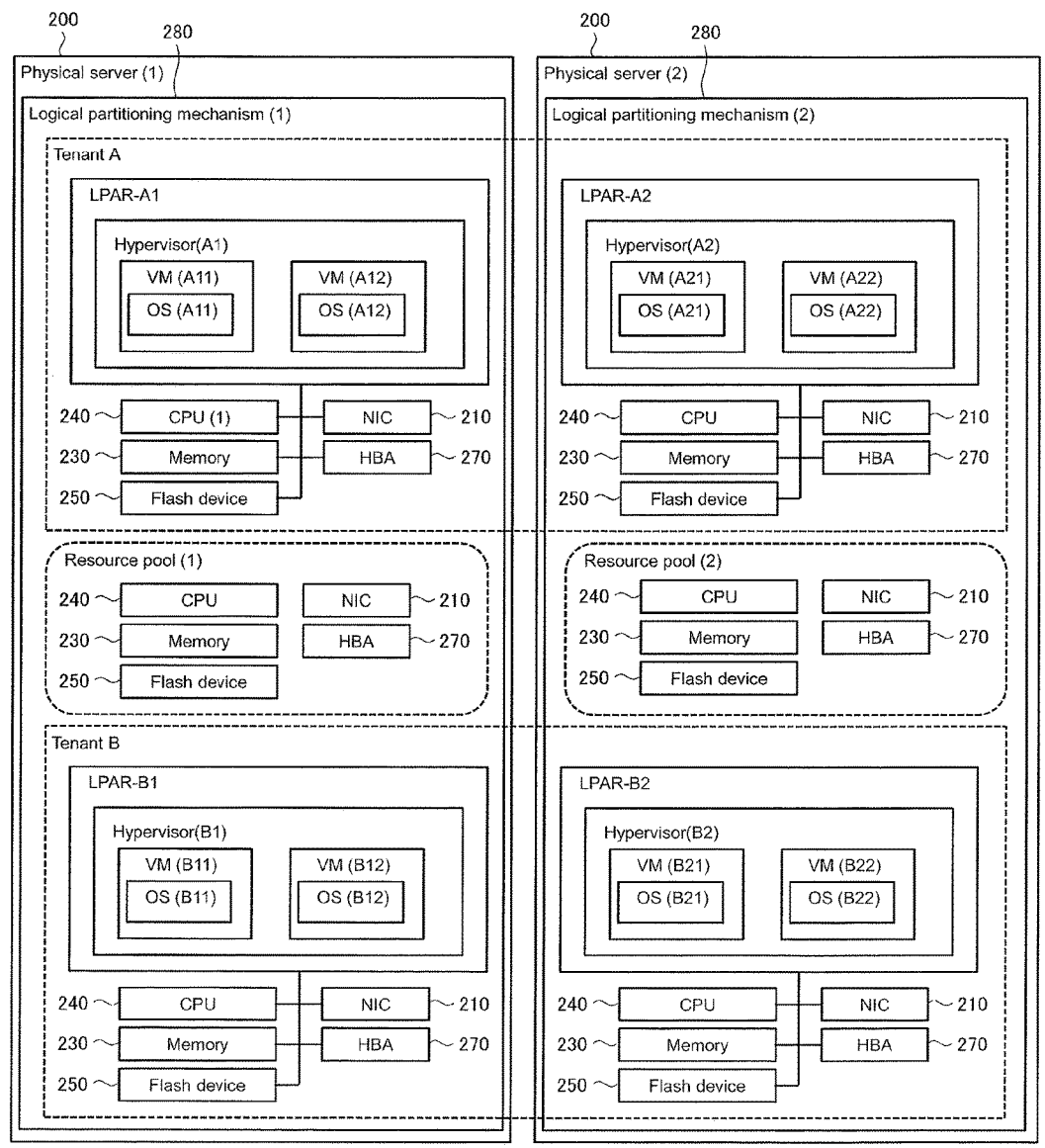
FIG. 2 illustrates a logical configuration of a physical server 200

FIG. 2 illustrates a logical configuration of the physical server 200.

Here, physical servers (1) and (2), in the plurality of physical servers 200, will be described. The physical server (1) implements a logical partitioning mechanism (1). The physical server (2) implements a logical partitioning mechanism (2).

A tenant user of a tenant A instructs the logical partitioning mechanism (1) to generate an LPAR-A1, and instructs the logical partitioning mechanism (2) to generate an LPAR-A2, through the management server 100 or the display computer 400. A tenant user of a tenant B instructs the logical partitioning mechanism (1) to generate an LPAR-B1, and instructs the logical partitioning mechanism (2) to generate an LPAR-B2, through the management server 100 or the display computer 400. The logical partitioning mechanism (1) allocates resources such as the CPU, the memory, the flash devices, the NIC, and the HBA in the physical server (1) to each of the LPAR-A1 and the LPAR-B1. The logical partitioning mechanism (2) allocates resources such as the CPU 240, the memory 230, the flash devices 250, the NIC 210, and the HBA 270 in the physical server (2) to each of the LPAR-A1 and the LPAR-B1.

The tenant user of the tenant A causes the LPAR-A1 to implement a hypervisor (A1), and causes the LPAR-A2 to implement a hypervisor (A2), through the management server 100 or the display computer 400. The tenant user of the tenant A instructs the hypervisor (A1) to generate a VM (A11) and a VM (A12), and instructs the hypervisor (A2) to generate a VM (A21) and a VM (A22), through the management server 100 or the display computer 400. The tenant user of the tenant A causes the VM (A11), the VM (A12), the VM (A21), and the VM (A22) to respectively implement an OS (A11), an OS (A12), an OS (A21), and an OS (A22) for tasks, through the management server 100 or the display computer 400. Similarly, the tenant user of the tenant B causes the LPAR-B1 to implement a hypervisor (B1), and causes the LPAR-B2 to implement a hypervisor (B2), through the management server 100 or the display computer 400. The tenant user of the tenant B instructs the hypervisor (B1) to generate a VM (B11) and a VM (B12), and instructs the hypervisor (B2) to generate a VM (B21) and a VM (B22), through the management server 100 or the display computer 400. The tenant user of the tenant B causes the VM (B11), the VM (B12), the VM (B21), and the VM (B22) to respectively implement an OS (B11), an OS (B12), an OS (B21), and an OS (B22) for businesses, through the management server 100 or the display computer 400.

The logical partitioning mechanism (1) manages as a resource pool (1), resources, not allocated to a shared resource and the LPAR, in normal resources in the physical server (1). Similarly, the logical partitioning mechanism (2) as a resource pool (2), resources, not allocated to a shared resource and the LPAR, in normal resources in the physical server (2)

Figure 3:
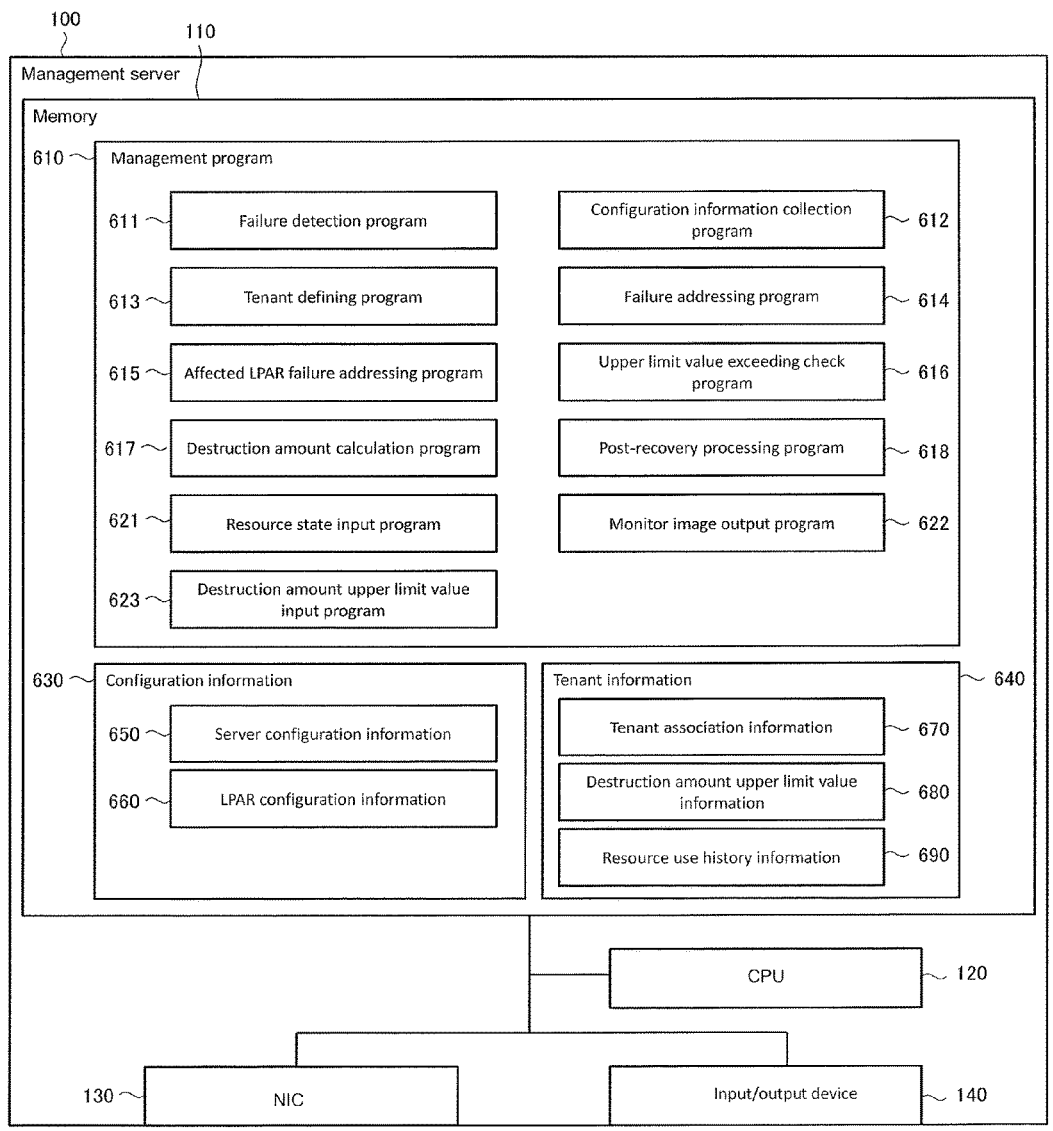
FIG. 3 illustrates a configuration of a management server 100.

FIG. 3 illustrates a configuration of the management server 100.

The management server 100 includes a memory 110, a CPU 120, an NIC 130, and an input/output device 140. The memory 110 stores a program and data used for processing executed by the management server 100. The memory 110 may be a local storage such as a flash memory or an HDD. The CPU 120 executes processing based on the program and the data stored in the memory 110. The NIC 130 is coupled to the LAN 510, and communicates with the physical server 200 and the display computer 400. The input/output device 140 includes: an input device such as a keyboard and a pointing device; and an output device such as a display and a printer.

The memory 110 stores a management program 610, configuration information 630, and tenant information 640. The configuration information 630 indicates a configuration of the physical server 200. The tenant information 640 indicates a corresponding relationship between a tenant and an LPAR, that is, which tenant is using which LPAR.

The management program 610 includes a failure detection program 611, a configuration information collection program 612, a tenant defining program 613, a failure addressing program 614, an affected LPAR failure addressing program 615, an upper limit value exceeding check program 616, a destruction amount calculation program 617, a post-recovery processing program 618, a resource state input program 621, a monitor image output program 622, and a destruction amount upper limit value input program 623.

The configuration information 630 includes server configuration information 650 and LPAR configuration information 660. The tenant information 640 includes tenant association information 670, destruction amount upper limit value information 680, and resource use history information 690.

The configuration information collection program 612 collects from the physical server 200, information on the physical resource installed in the physical server 200, and generates the server configuration information 650 based on the collected information. Furthermore, the configuration information collection program 612 collects information on the LPAR established in the physical server 200, and generates the LPAR configuration information 660 based on the collected information. The LPAR configuration information 660 indicates a corresponding relationship between an LPAR and a physical resource, that is, which LPAR is using how much and which physical resource. The configuration information collection program 612 may acquire the configuration information from the physical server 200 when the LPAR is established, may periodically acquire the configuration information from the physical server 200, or may acquire the configuration information from the physical server 200 in accordance with an event notified from the physical server 200.

The tenant defining program 613 transmits tenant defining information, input from the overall administrator by using the management server 100 or the display computer 400, to the physical server 200. The tenant defining program 613 acquires the tenant defining information stored in the physical server 200, and generates the tenant association information 670 and the resource use history information 690 based on the received information. The tenant defining information stored in the physical server 200 may also be stored in the management server 100. In this case, the tenant defining information needs not to be received from the physical server 200. The tenant user cannot operate the tenant defining information.

The display computer 400 includes a memory, a CPU, an NIC, and an input/output device as in the case of the management server 100.

Figure 4:
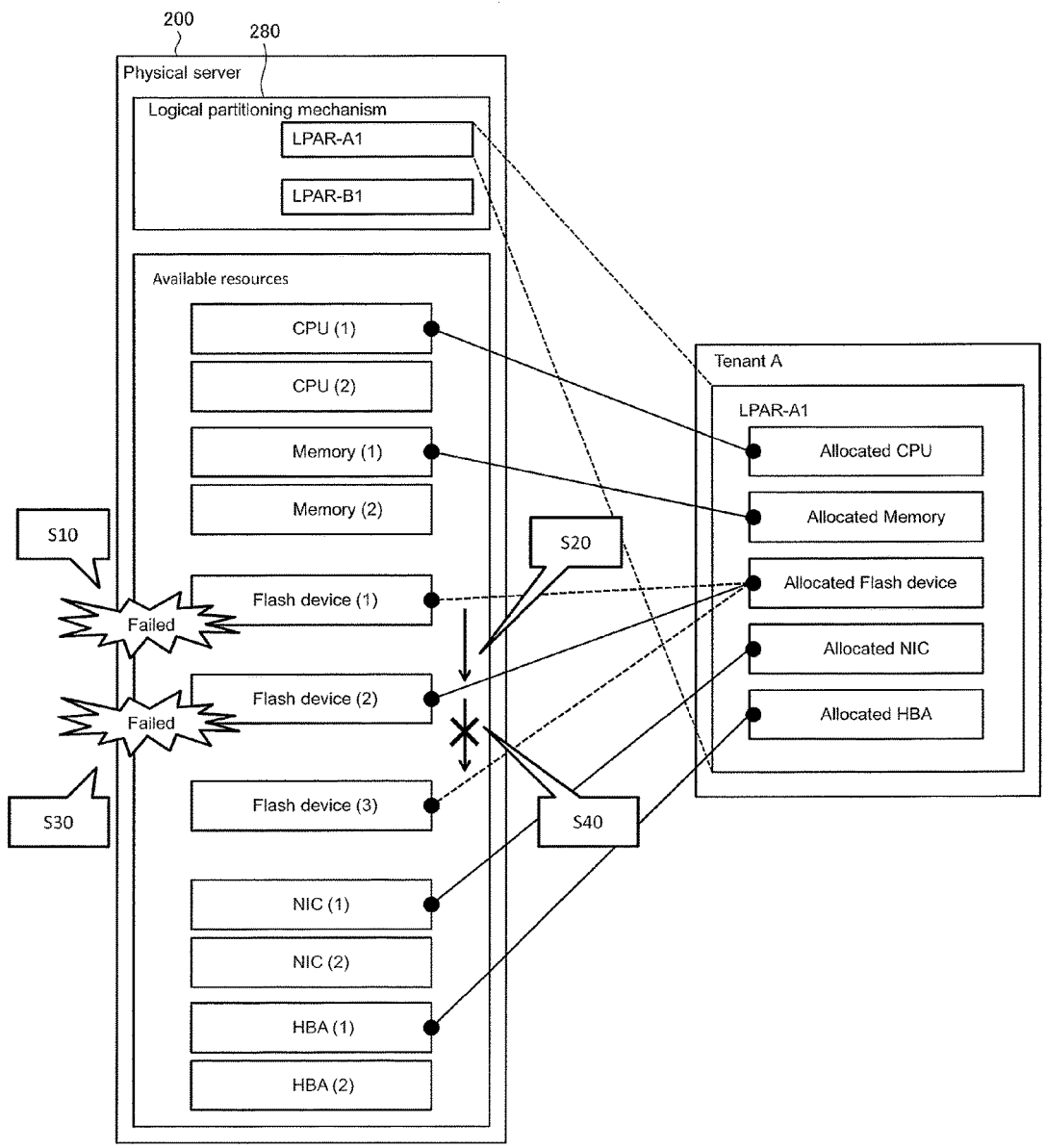
FIG. 4 illustrates an overview of an operation performed by the computer system.

FIG. 4 illustrates an overview of an operation performed by the computer system.

The figure illustrates transition of a state in which the physical server (1) allocates a resource to the LPAR-A1, used by the tenant user of the tenant A, in the multi-tenant environment established in the physical server (1).

The physical server (1) includes a CPU (1), a CPU (2), a memory (1), a memory (2), a flash device (1), a flash device (2), a flash device (3), an NIC (1), an NIC (2), an HBA (1), and an HBA (2), as available resources available for the LPAR. It is assumed that the CPU (1), the memory (1), the flash device (1), the NIC (1), and the HBA (1) of the available resources are allocated to the LPAR-A1 of the tenant A, and are respectively referred to as an allocated CPU, an allocated memory, an allocated flash device, an allocated NIC, and an allocated HBA.

Here, it is assumed that the flash device (1) fails (S10). Then, the management server 100 cancels the allocation of the flash device (1) to the LPAR-A1. Here, it is assumed that a condition that the destruction amount, as a sum of resource amounts of flash devices that have been used by the tenant A and have failed so far, does not exceed an upper limit value set in advance is satisfied. In such a case, the management server 100 allocates the normal flash device (2) to the LPAR-A1, instead of the failed flash device (1), and recovers the LPAR-A1 (S20).

Then, when the flash device (2) allocated to the LPAR-A1 fails (S30), the management server 100 cancels the allocation of the flash device (2) to the LPAR-A1. Here, it is assumed that the condition that the resource amount that has been used by the tenant A so far does not exceed the upper limit value set in advance is not satisfied. In this case, the management server 100 does not allocate the normal flash device to the LPAR-A1 (S40).

Through this operation, the excessive resource destruction by a certain tenant repeating the destruction and reallocation of resource for the LPAR can be prevented, and thus, the resource amount in the resource pool that can be allocated to another tenant can be prevented from decreasing.

As described later, the management server 100 may perform a failover of the failed LPAR to another physical server.

The configuration information 630 and the tenant information 640, stored in the management server 100, are described below.

FIG. 5 illustrates the server configuration information 650.

The server configuration information 650 is generated by the configuration information collection program 612. The server configuration information 650 includes a physical server ID 651, a logical partitioning mechanism ID 652, and held resource information 653 that are associated with each other. The physical server ID 651 indicates an identifier of the physical server 200. The logical partitioning mechanism ID 652 indicates an identifier of a logical partitioning mechanism. The held resource information 653 indicates each resource obtained by the dividing by the logical partitioning mechanism. The held resource information 653 of a certain resource includes a resource type 654, a resource ID 655, a resource amount 656, a resource state 657, in-use information 658, and occupied/shared information 659. The resource type 654 indicates a type of the resource. For example, the resource type 654 is a CPU, a memory, flash devices, an NIC, a HBA, or the like. The resource ID 655 indicates an identifier of the resource. The resource amount 656 indicates an amount of the resource. For example, the resource amount 656 indicates the number of cores of the CPU, a storage capacity of the memory, a storage capacity of the flash device, or the like. The resource state 657 indicates whether the resource is normal or has failed. The in-use information 658 indicates whether or not the resource is being used by the LPAR. The occupied/shared information 659 indicates whether or not the resource is an occupied resource occupied to a single LPAR or a shared resource that can be shared among a plurality of LPARs.

FIG. 6 illustrates the LPAR configuration information 660.

The LPAR configuration information 660 is generated by the configuration information collection program 612. The LPAR configuration information 660 includes an LPAR-ID 661, a logical partitioning mechanism ID 662, an LPAR operating state 663, and allocated resource information 664 that are associated with each other. The LPAR-ID 661 indicates an identifier of an LPAR. The logical partitioning mechanism ID 662 indicates an identifier of a logical partitioning mechanism establishing the LPAR. The LPAR operating state 663 indicates whether or not the LPAR is in operation or stopped. The allocated resource information 664 of a certain resource includes a resource type 665, a resource ID 666, and a resource amount 667. The resource type 665 indicates a type of the resource. The resource ID 666 indicates an identifier of the resource. The resource amount 667 indicates an amount of the resource.

FIG. 7 illustrates the tenant association information 670.

The tenant association information 670 is generated by the tenant defining program 613. The tenant association information 670 includes a tenant ID 671, a used LPAR-ID 672, and hypervisor information 673 that are associated with each other. The tenant ID 671 indicates an identifier of the tenant. The used LPAR-ID 672 indicates an identifier of the LPAR used by the tenant. The hypervisor information 673 indicates whether or not the LPAR is implementing the hypervisor.

FIG. 8 illustrates the destruction amount upper limit value information 680.

The destruction amount upper limit value information 680 is generated by the destruction amount upper limit value input program 623. The destruction amount upper limit value information 680 includes a tenant ID 681, a resource type 682, a destruction amount upper limit value 683, and upper limit value exceeding information 684 that are associated with each other. The tenant ID 681 indicates an identifier of the tenant. The resource type 682 indicates a type of the resource to be used by the tenant. The destruction amount upper limit value 683 indicates an upper limit value of the amount of the resource of the resource type that can fail due to the tenant. The upper limit value exceeding information 684 indicates whether or not the amount of the resource of the resource type, failed due to the tenant, has exceeded the destruction amount upper limit value 683. When the resource of the resource type, failed due to the tenant, has exceeded the destruction amount upper limit value 683, the management server 100 refrains from newly allocating the resource of the resource type to the tenant.

The destruction amount upper limit value 683 is determined by a contract with the tenant user, and is input to the management server 100 by the overall administrator. The destruction amount upper limit value 683 may be predetermined based on a level of a service provided to the tenant user, or may be a value obtained by adding a margin to the resource amount scheduled to be actually used by the tenant.

FIG. 9 illustrates the resource use history information 690.

The resource use history information 690 is generated by the tenant defining program 613. The resource use history information 690 includes a resource ID 691, a used tenant ID 692, a used LPAR-ID 693, a use history 694, and an allocated amount 695 that associated with each other. The resource ID 691 indicates an identifier of a resource. The used tenant ID 692 indicates an identifier of a tenant that has used the resource. The used LPAR-ID 693 indicates an identifier of an LPAR to which the resource is allocated. The use history 694 indicates a used state of the resource by the LPAR. The allocated amount 695 indicates an amount of the resource allocated to the LPAR, and is equal to the resource amount 667 corresponding to the LPAR and the resource in the LPAR configuration information 660. The use history 694 of the flash device indicates the number of times the writing is performed by the LPAR. The use history 694 of the CPU is set to be the same value as the allocated amount 695.

The use history 694 is related to the failure of a resource of a certain resource type. For example, the failure of the flash device 250 is related to the number of writings as the use history 694. On the other hand, the use history 694 is not related to the failure of a resource of a certain resource type. For example, the CPU 240 fails due to a momentary phenomenon such as overheating. The number of times the writing is performed to the flash device 250 may be recorded by the physical server 200 or by the flash device 250. The number of times the writing is performed is acquired by the tenant defining program 613 from the physical server 200, to be reflected on the use history 694 of the resource use history information 690. Even when the LPAR is deleted and the allocation of the resource is canceled, the use history 694 remains until the resource is replaced.

An operation of each program of the management server 100 is described below.

Figure 10:
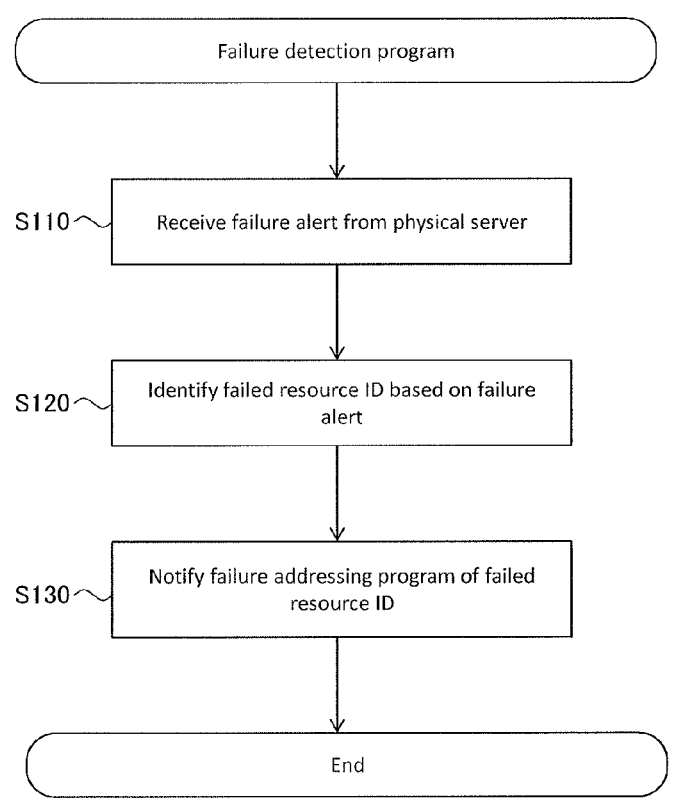
FIG. 10 illustrates an overview of an operation performed by a failure detection program 611.

FIG. 10 illustrates an operation performed by the failure detection program 611.

Upon detecting the failure of a resource, the physical server 200 transmits a failure alert to the management server 100. The failure alert indicates the type of the failure such as the overheating of the CPU, and a failed resource as the resource that has failed.

The failure detection program 611 that has received the failure alert from the physical server 200 in S110 sets the physical server 200 that has transmitted the failure alert as an affected physical server, and the processing proceeds to S120. The failure detection program 611 identifies the failed resource ID as the resource ID of the failed resource based on the failure alert in S120 and notifies the failure addressing program 614 of the failed resource ID in S130, and this flow is terminated. Then, the failure detection program 611 repeats the flow.

With the failure detection program 611 described above, the management server 100 can acquire the information indicating the failure of the resource in the affected physical server, and can operate in accordance with the acquired information.

Figure 11:
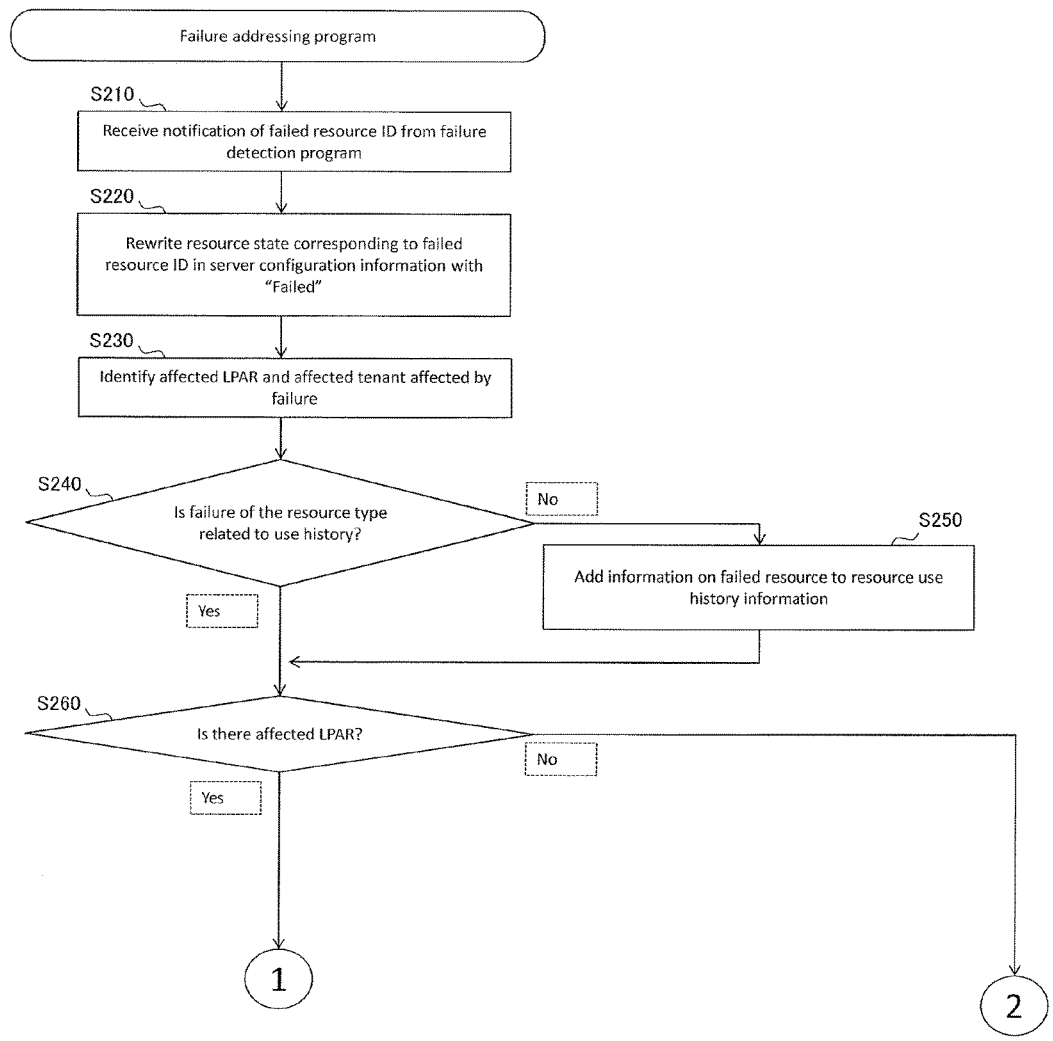
FIG. 11 illustrates an overview of a first operation performed by a failure addressing program 614.
Figure 12:
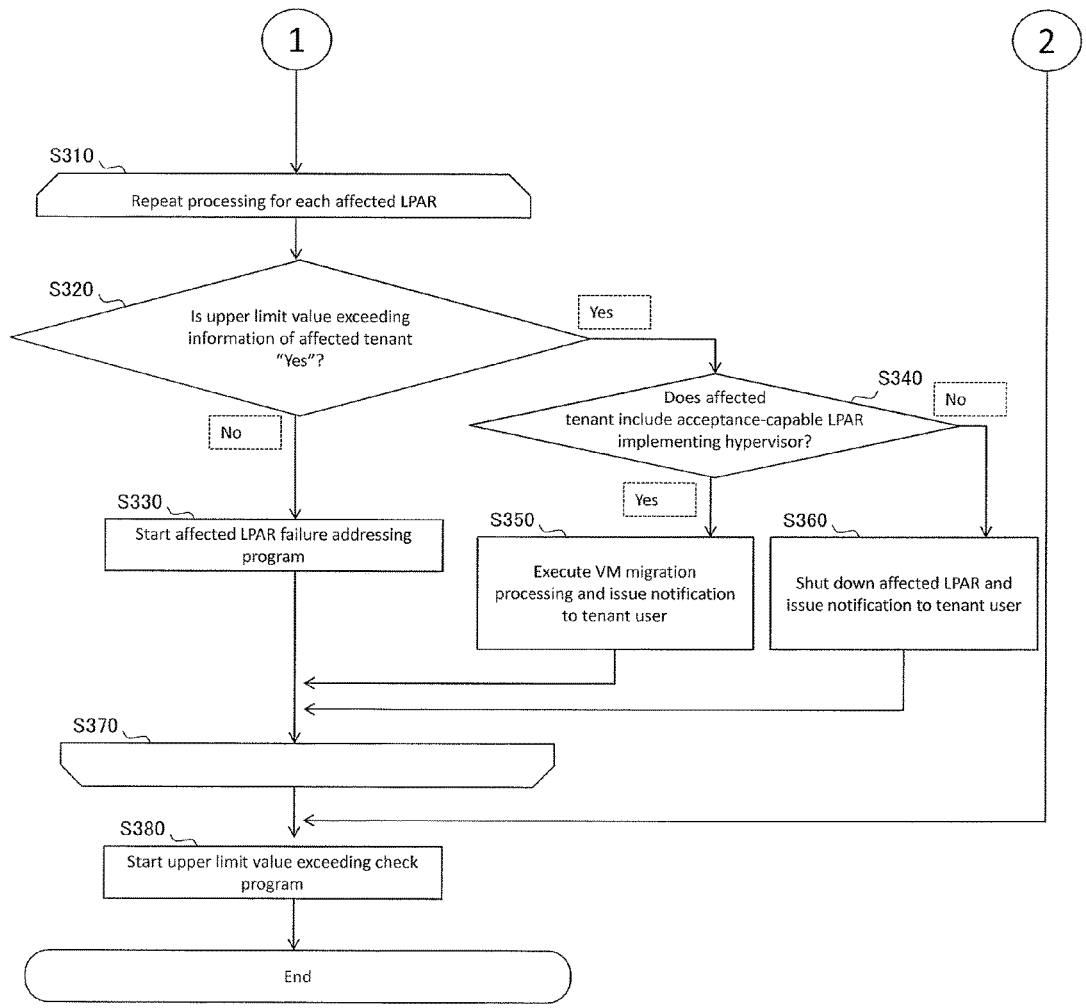
FIG. 12 illustrates an overview of a second operation performed by the failure addressing program 614 after the first operation.

FIG. 11 illustrates a first operation performed by the failure addressing program 614, and FIG. 12 illustrates a second operation performed by the failure addressing program 614 after the first operation.

The failure addressing program 614 receives a failed resource ID from the failure detection program 611 in S210, and the processing proceeds to S220. The failure addressing program 614 rewrites "normal" as the resource state 657 of the failed resource with "failed" in the server configuration information 650, in S220. In S230, the failure addressing program 614 identifies the LPAR associated with the failed resource based on the LPAR configuration information 660 as an affected LPAR, and identifies the tenant associated with the affected LPAR as an affected tenant based on the tenant association information 670.

In S240, the failure addressing program 614 determines whether or not the failure is related to the use history. For example, the failure addressing program 614 determines that the use history is the number of times the writing is performed and that the failure is related to the use history when the resource type of the failed resource is the flash device, and determines that the failure is not related to the use history when the resource type of the failed resource is not the flash device.

When the failure addressing program 614 determines that the failure is related to the use history in S240, the processing proceeds to S260. In this case, the use history of the failed resource for each LPAR has already been stored in the use history 694 of the resource use history information 690.

Upon determining that the failure is not related to the use history in S240, the failure addressing program 614 adds information on the failed resource to the resource use history information 690 in S250, and the processing proceeds to S260. Here, the failure addressing program 614 adds the information on the failed resource for all the LPARs associated with the failed resource. The used resource amount set for each of the use history 694 and the allocated amount 695 of the affected LPAR is obtained by the following formula.

Used resource amount=sum of resource amount of failed resource allocated to affected LPAR÷number of affected LPARs The resource amount of the CPU may be represented by the number of cores. For example, when one core of the CPU is allocated to one LPAR of the tenant A and three LPARs of the tenant B, the used resource amount set for each LPAR is one core÷four=0.25 cores.

In S260, the failure addressing program 614 determines whether or not there is the affected LPAR affected by the failure. The failure addressing program 614 determines that there is the affected LPAR when the LPAR configuration information 660 includes the LPAR-ID associated with the failed resource ID.

When the failure addressing program 614 determines that there is no affected LPAR in S260 (No), the processing proceeds to S380. For example, this corresponds to a case where the core of the CPU fails, but the failed core is not allocated to the LPAR.

When the failure addressing program 614 determines that there is the affected LPAR in S260 (Yes), the processing proceeds to S310.

In S310, the failure addressing program 614 selects one of the affected LPARs and executes processing from S310 to S370 for each affected LPAR.

In S320, the failure addressing program 614 determines whether or not the destruction amount upper limit value information 680 includes Yes for the upper limit value exceeding information 684 corresponding to the affected tenant.

Upon determining that all the upper limit value exceeding information 684 corresponding to the affected tenant is No in S320 (No), the failure addressing program 614 starts the affected LPAR failure addressing program 615 in S330, and the processing proceeds to S370.

Upon determining that any of the upper limit value exceeding information 684 corresponding to the affected tenant is Yes in S320 (Yes), the failure addressing program 614 determines whether or not the affected tenant includes an acceptance-capable LPAR as an LPAR that is not the affected LPAR and is implementing the hypervisor based on the tenant association information 670 in S340.

Upon determining that the affected tenant includes the acceptance-capable LPAR in S340 (Yes), the failure addressing program 614 executes VM migrating processing of migrating a VM on the affected LPAR to the acceptance-capable LPAR and notifies the tenant user of the VM migration in S350, and the processing proceeds to S370. The VM migration processing may be failover (cold migration) or migration (hot migration). The failover is processing of shutting down all the VMs on the affected LPAR and restarting the VMs on the acceptance-capable LPAR. The migration is processing of migrating active instances of all the VMs on the affected LPAR to the hypervisor on the acceptance-capable LPAR. The failure addressing program 614 transmits an instruction to execute the VM migration processing to the affected physical server and to the physical server implementing the acceptance-capable LPAR. The failure addressing program 614 may display the notification to the tenant user on the input/output device of the management server 100 or the display computer 400, or may transmit the notification to an address set in advance with an e-mail and the like.

Upon determining that the affected tenant includes no acceptance-capable LPAR in S340 (No), the failure addressing program 614 shuts down the affected LPAR, and notifies the tenant user of information indicating that the VM migration processing is not executable, and that the affected LPAR cannot be started (rebooted) in S360, and the processing proceeds to S370. Here, the failure addressing program 614 transmits an instruction to shut down the affected LPAR to the affected physical server.

When the failure addressing program 614 finds the next affected LPAR in S370, the processing returns to S310. When finding no next affected LPAR in S370, the failure addressing program 614 starts the upper limit value exceeding check program 616 in S380, and the flow is terminated.

The failure addressing program 614 may determine a target of the VM migration processing in accordance with the type of the failure indicated by the failure alert.

With the failure addressing program 614 described above, even when the resource amount used by the affected tenant exceeds the destruction amount upper limit value set in advance, if the affected tenant includes the acceptance-capable LPAR, the VM on the affected LPAR can be continued to be implemented by being migrated to the acceptance-capable LPAR. Thus, the affected tenant can continue the task with the entire resource reduced. When the resource amount used by the affected tenant exceeds the destruction amount upper limit value set in advance, and the affected tenant includes no acceptance-capable LPAR, the affected LPAR is shut down, so that the task carried out on the affected LPAR can be safely stopped. Furthermore, the resources can be prevented from being further destroyed by the affected tenant.

Figure 13:
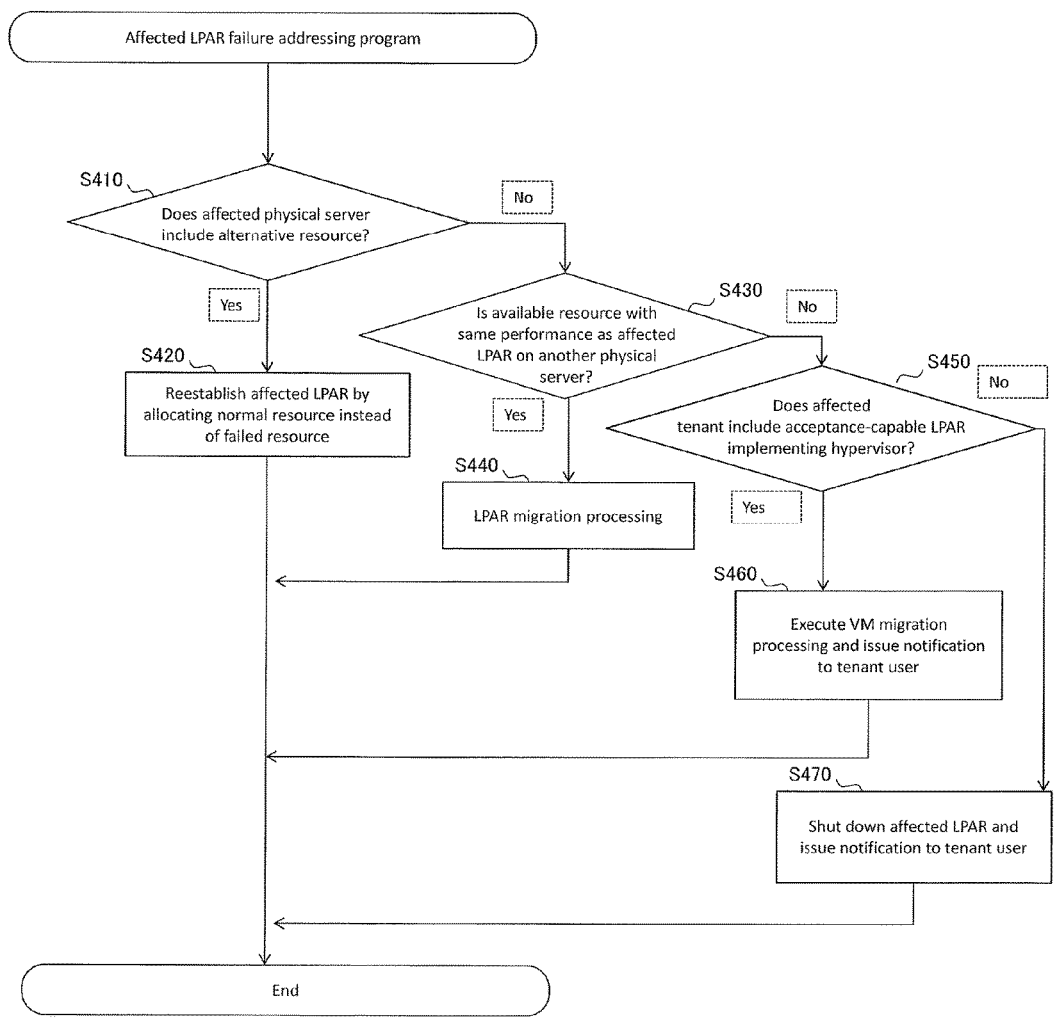
FIG. 13 illustrates an operation performed by an affected LPAR failure addressing program 615.

FIG. 13 illustrates an operation performed by the affected LPAR failure addressing program 615.

In S410, the affected LPAR failure addressing program 615 determines whether or not the affected physical server includes an alternative resource for the failed resource, based on the server configuration information 650. Here, the affected LPAR failure addressing program 615 finds a resource in the resource pool of the affected physical server that can be used instead of the failed resource as the alternative resource. The alternative resource is of the same resource type as the failed resource and has a resource amount not smaller than the resource amount of the failed resource.

Upon determining that there is the alternative resource in S410 (Yes), the affected LPAR failure addressing program 615 cancels the allocation of the failed resource to the affected LPAR in S420, and reestablishes the affected LPAR by allocating the alternative resource instead of the failed resource, and the flow is terminated. Here, the affected LPAR failure addressing program 615 transmits an instruction to reestablish the affected LPAR to the affected physical server.

Upon determining that there is no alternative resource in S410 (No), the affected LPAR failure addressing program 615 determines whether or not there is an available resource for establishing an LPAR that has the same performance as (equivalent to) the affected LPAR on the physical server 200 other than the affected physical server in S430. The available resource has the same resource type and the same resource amount as all the resources allocated to the affected LPAR.

Upon determining that there is the available resource for establishing the LPAR with the same specification in S430 (Yes), the affected LPAR failure addressing program 615 executes LPAR migration processing of setting the physical server 200 including the available resource as the acceptance-capable physical server, establishing the LPAR on the acceptance-capable physical server by using the available resource, and migrating the affected LPAR on the affected physical server to the acceptance-capable physical server, in S440. The LPAR migration processing may be the failover or the migration as in the case of the VM migration processing. The affected LPAR failure addressing program 615 cancels the allocation of the normal resource allocated to the affected LPAR, and puts the normal resource in the resource pool to be available for other LPARs. The affected LPAR failure addressing program 615 transmits an instruction to execute the LPAR migration processing to the affected physical server and the acceptance-capable physical server.

Upon determining that there is no available resource for establishing the LPAR with the same performance in S430 (No), the affected LPAR failure addressing program 615 determines whether or not the affected tenant includes the acceptance-capable LPAR as an LPAR that is different from the affected LPAR and is implementing the hypervisor in S450, based on the tenant association information 670.

Upon determining that the affected tenant includes the acceptance-capable LPAR in S450 (Yes), the affected LPAR failure addressing program 615 executes the VM migration processing, and notifies the tenant user of the VM migration in S460, and the flow is terminated. Here, the affected LPAR failure addressing program 615 transmits an instruction to execute the VM migration processing to the affected physical server and the acceptance-capable physical server.

Upon determining that the affected tenant includes no acceptance-capable LPAR in S450 (No), the affected LPAR failure addressing program 615 shuts down the affected LPAR and notifies the tenant user of information indicating that the VM migration processing cannot be executed and the VM of the affected LPAR cannot be started in S470, and the flow is terminated. Here, the affected LPAR failure addressing program 615 transmits an instruction to shut down the affected LPAR to the affected physical server.

When the affected tenant includes the acceptance-capable LPAR implementing the hypervisor, the affected LPAR failure addressing program 615 may execute the VM migration processing from the affected LPAR to the acceptance-capable LPAR, before executing the LPAR migration processing. For example, the affected LPAR failure addressing program 615 may set a priority to each VM, and select the VM migration processing and the LPAR migration processing in accordance with the priority. For example, when the priority as one of three levels of high, medium, and low is set to the VM, the affected LPAR failure addressing program 615 preferentially retracts the VM with high as the priority by the VM migration processing, does not migrate but shuts down the VM with low as the priority, and retracts the VM with medium as the priority, together with the hypervisor, by the LPAR migration processing. By thus selectively executing the VM migration processing and the LPAR migration processing in accordance with the priority, the failure can be flexibly addressed. With the number of operating VM on the affected LPAR and the memory use amount of the hypervisor on the affected LPAR reduced by the VM migration processing, loads as a result of the processing and communications in the LPAR migration processing can be reduced.

With the affected LPAR failure addressing program 615 described above, if the affected physical server includes the alternative resource, the implementation of the VM on the affected LPAR can be continued with the alternative resource allocated to the affected LPAR instead of the failed resource. When the acceptance-capable physical server includes the available resource with the same resource amount as the affected LPAR, the implementation of the VM can be continued with the affected LPAR on the affected physical server migrated to the acceptance-capable physical server. Thus, the affected tenant can continue the task without reducing the resource. Even when the affected physical server includes no alternative resource and the acceptance-capable physical server includes no available resource, if the affected tenant includes the acceptance-capable LPAR implementing the hypervisor, the VM can be migrated from the affected LPAR to the acceptance-capable LPAR. Thus, the affected tenant can continue the task with the entire resource reduced. When the affected physical server includes no alternative resource, the acceptance-capable physical server includes no available resource, and the affected tenant includes no acceptance-capable LPAR, the affected LPAR is shut down so that the task carried out on the affected LPAR can be safely stopped. Furthermore, the resource can be prevented from being further destroyed by the affected tenant.

When it is determined that the destruction amount is equal to or less than the upper limit value, the failure addressing program 614 and the affected LPAR failure addressing program 615 determine whether or not any one of the plurality of physical servers 200 includes the acceptance-capable physical resource as a physical resource that can be alternatively used instead of the failed resource. When it is determined that there is the acceptance-capable physical resource, the acceptance-capable physical resource is allocated to the virtual computer instead of the failed resource. The acceptance-capable physical resource includes any one of the alternative resource in the affected physical server, the available resource in the acceptance-capable physical server, and the physical resource allocated to the acceptance-capable LPAR. Thus, the operation of the VM on the affected LPAR can be continued.

Figure 14:
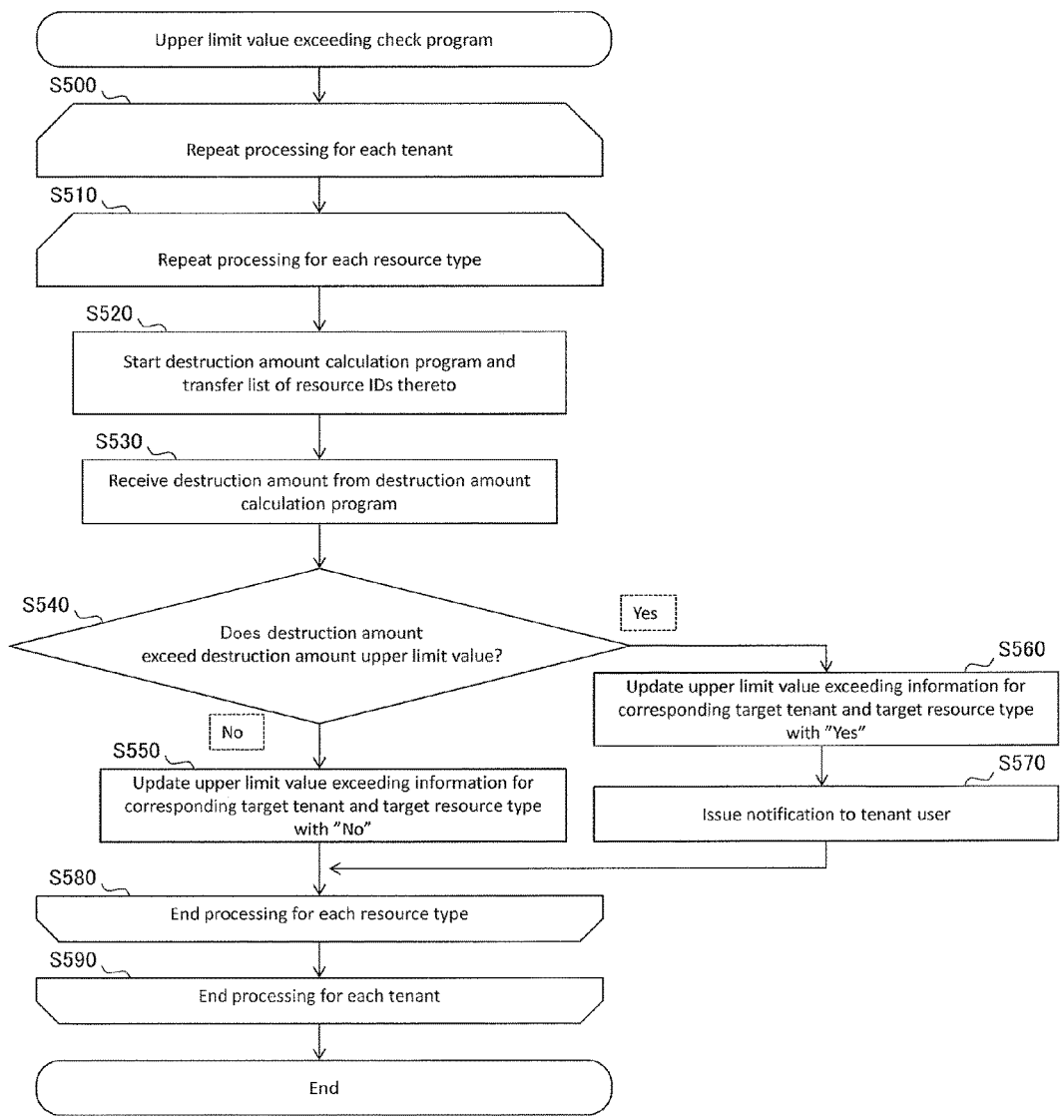
FIG. 14 illustrates an operation performed by an upper limit value exceeding check program 616.

FIG. 14 illustrates an operation performed by the upper limit value exceeding check program 616.

In S500, the upper limit value exceeding check program 616 acquires all the tenants from the used tenant 692 in the resource use history information 690, and selects each of the acquired tenants as one target tenant, and executes the processing from S500 to S590 on each target tenant.

In S510, the upper limit value exceeding check program 616 acquires all the resource IDs from the resource ID 691 in the resource use history information 690, acquires all the resource types corresponding to the acquired resource IDs from the resource type 654 of the server configuration information 650, selects each of the acquired resource types as one target resource type, and executes processing from S510 to S580 on each target resource type.

In S520, the upper limit value exceeding check program 616 starts the destruction amount calculation program 617, and transfers a list of all the resource IDs corresponding to the target tenant and the target resource type and the tenant ID of the target tenant to the destruction amount calculation program 617. In S530, the upper limit value exceeding check program 616 receives the destruction amount from the destruction amount calculation program 617.

In S540, the upper limit value exceeding check program 616 acquires the destruction amount upper limit value 683 corresponding to the target tenant and the target resource type in the destruction amount upper limit value information 680, and determines whether or not the destruction amount exceeds the destruction amount upper limit value.

Upon determining that the destruction amount does not exceed the destruction amount upper limit value in S540 (No), the upper limit value exceeding check program 616 sets No as the upper limit value exceeding information 684 corresponding to the acquired destruction amount upper limit value in S550, and the processing proceeds to S580.

Upon determining that the destruction amount exceeds the destruction amount upper limit value in S540 (Yes), the upper limit value exceeding check program 616 sets "Yes" as the upper limit value exceeding information 684 corresponding to the acquired destruction amount upper limit value in S560, and notifies the tenant user of the target tenant of information indicating that the resource cannot be allocated any more in S570, and the processing proceeds to S580.

The processing returns to S510 when the upper limit value exceeding check program 616 determines that there is a next target resource type in S580, and proceeds to S590 when there is no next target resource type. The processing returns to S500 when the upper limit value exceeding check program 616 determines that there is a next target tenant in S590, and the flow is terminated when there is no next target tenant.

With the upper limit value exceeding check program 616 described above, whether or not the resource amount that has been used so far by each tenant exceeds the destruction amount upper limit value set in advance can be determined.

Figure 15:
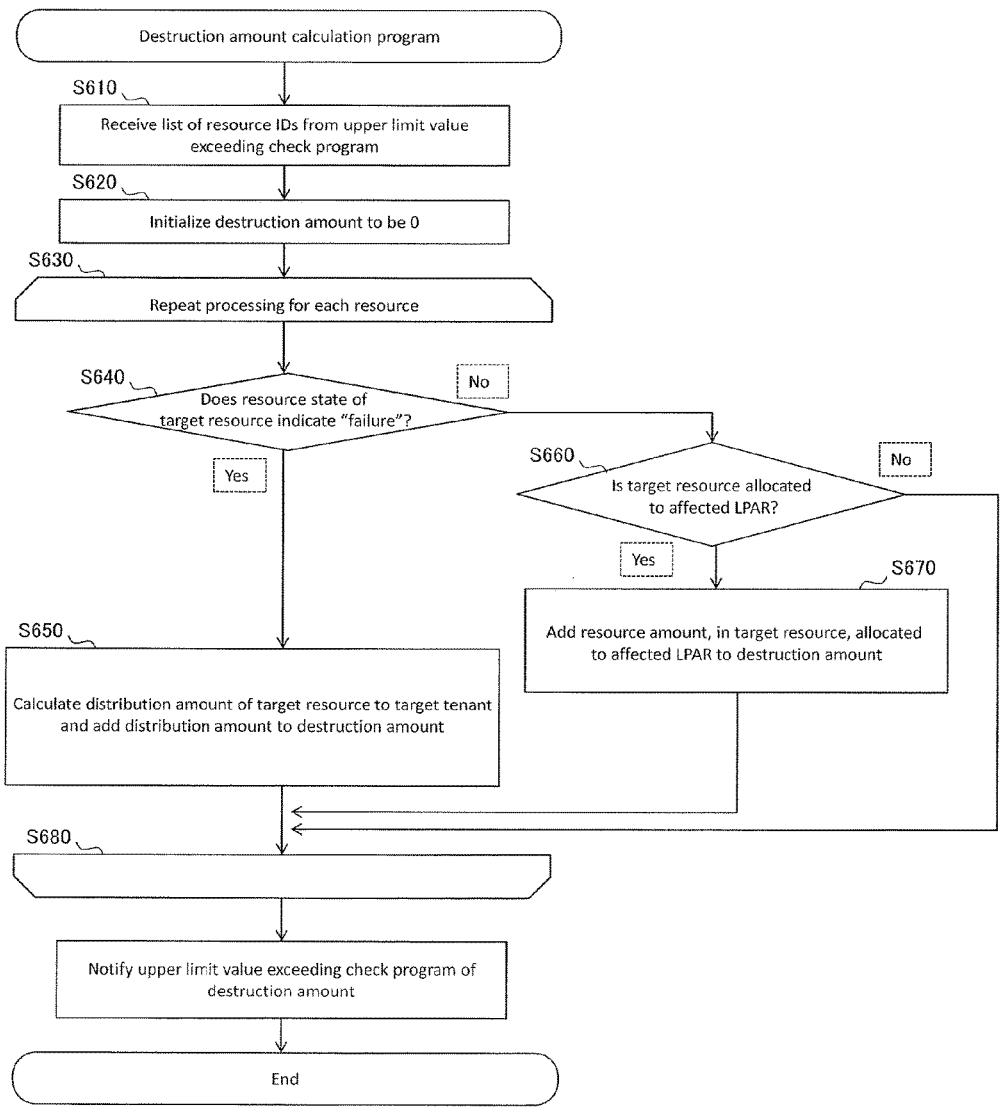
FIG. 15 illustrates an operation performed by a destruction amount calculation program 617.

FIG. 15 illustrates an operation of the destruction amount calculation program 617.

In S610, the destruction amount calculation program 617 acquires a list of resource IDs corresponding to the target tenant and the target resource type from the upper limit value exceeding check program 616. In S620, the destruction amount calculation program 617 initializes the destruction amount to be 0.

In S630, the destruction amount calculation program 617 selects one of the resource IDs in the list, and executes processing from S630 to S680 on each target resource.

In S640, the destruction amount calculation program 617 determines whether or not the resource state 657 of the target resource in the server configuration information 650 indicates failure.

Upon determining that the resource state 657 of the target resource indicates failure in S640 (Yes), the destruction amount calculation program 617 calculates a distributed amount of the target resource to the target tenant and adds the calculated distributed amount to the destruction amount in S650, and the processing proceeds to S680. The distributed amount indicates the resource amount, allocated in accordance with the use history of the target tenant, in the resource amount of the target resource, and is obtained by the following formula based on the resource use history information 690.

$$\text{Distributed amount} = \text{total value of allocated amount} \\ \text{695 of target resource to all tenants} \times \text{total value} \\ \text{of use history 694 of target resource of target} \\ \text{tenant} \div \text{total value of use history 694 of target} \\ \text{resource of all tenants}$$

The distributed amount of a flash device Flash 1-1 to the tenant A in FIG. 9 is described as an example. The total value of the allocated amount 695 of the target resources to all the tenants is 100 GB+100 GB+100 GB=300 GB. The total value of the use history 694 of the target resource by the target tenants is 8000 times+1000 times=9000 times. The total value of the use history 694 of the target resource by all the tenants is 8000 times+1000 times+1000 times=10000 times. Thus, the distributed amount of the Flash 1-1 to the tenant A is 300 GB×9000 times/10000 times=270 GB.

In this formula for calculating the distributed amount, the resource amount, not allocated to the affected LPAR, in the resource amount of the target resource is not added as the destruction amount. For example, when the CPU with three of four cores allocated and the remaining one core not allocated fails, the three cores are added as the distributed amount for each tenant, and the remaining one core is not added as the distributed amount. The resource amount not allocated to the tenant may be calculated as the distributed amount of the affected tenant.

When the target resource is the occupied resource, the distributed amount is the allocated amount 695 of the target resource allocated to the target tenant. The formula for calculating the distributed amount may differ among the resource types.

Upon determining that the resource state 657 corresponding to the target resource indicates normal in S640 (No), the destruction amount calculation program 617 determines whether or not the target resource is allocated to the affected LPAR based on the LPAR configuration information 660, in S660.

When the destruction amount calculation program 617 determines that the target resource is not allocated to the affected LPAR in S660 (No), the processing proceeds to S680. Here, the target resource is a normal resource that has been allocated to the affected LPAR but is currently not allocated to the affected LPAR.

Upon determining that the target resource is allocated to the affected LPAR in S660 (Yes), the destruction amount calculation program 617 adds to the destruction amount, the resource amount 667 corresponding to a resource amount, allocated to the affected LPAR, in the target resource, that is, the resource amount 667 corresponding to a combination between the target resource and the affected LPAR in the LPAR configuration information 660 in S670, and the processing proceeds to S680.

The processing returns to S630 when the destruction amount calculation program 617 finds a next target resource ID in S680. Upon finding no next target resource ID, the destruction amount calculation program 617 transfers the destruction amount to the upper limit value exceeding check program 616 in S690, and the flow is terminated.

With the destruction amount calculation program 617 described above, the total value of the resource amount of the target resource type failed by being used so far by the tenant can be calculated. The resource amount of the failed resource is distributed to the tenants using the failed resource in accordance with the use history, whereby the destruction amount can reflect the use by the tenant. When the failure relates to the accumulated use amount, as in the case of the flash memory or the like, the resource amount of the failed resource can be distributed to the tenants in accordance with the accumulated use amount of the failed resource by each tenant. When the failure does not relate to the accumulated use amount, as in the case of the CPU or the like, the resource amount of the failed resource can be distributed to the tenants, in accordance with the allocated amount of the failed resource to each tenant. For a certain resource type of a certain tenant, the destruction amount is calculated by adding the resource amount distributed in accordance with the use history of the tenant to the resource amount, allocated to the affected LPAR, in the resource amount of a resource different from the failed resource. Thus, the destruction amount can reflect the resource amount of the resource type used by the tenant.

Figure 16:
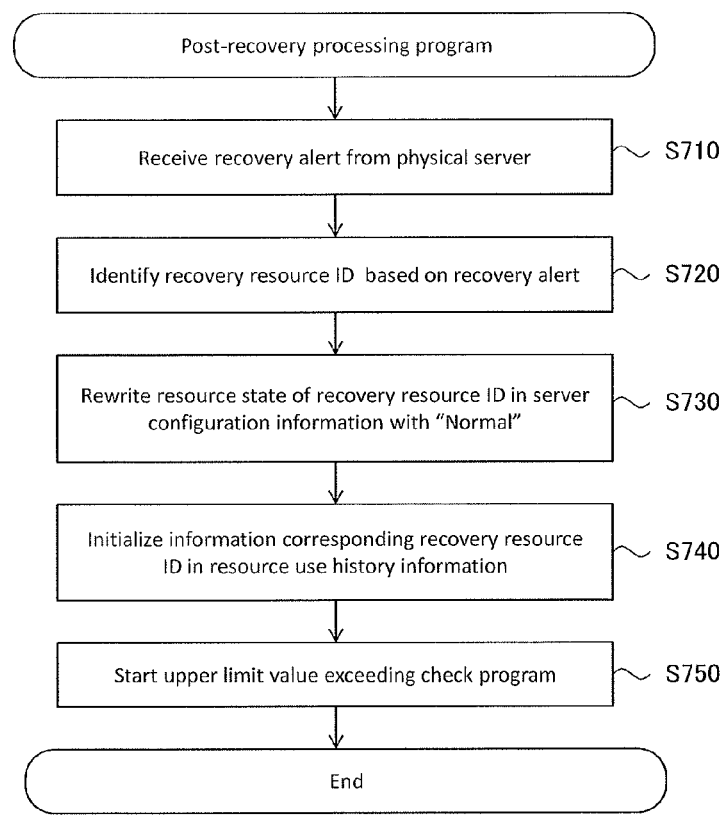
FIG. 16 illustrates an operation performed by a post-recovery processing program 618.

FIG. 16 illustrates an operation of the post-recovery processing program 618.

The physical server 200, in which the failed resource is replaced with a recovery resource as a new resource having the same resource type and the same resource amount, transmits a recovery alert to the management server 100. The recovery alert indicates the type of the recovery and the recovery resource.

In S710, the post-recovery processing program 618 receives the recovery alert from the physical server 200, and the processing proceeds to S720. In S720, the post-recovery processing program 618 identifies a recovery resource ID as the resource ID of the recovery resource based on the recovery alert.

In S730, the post-recovery processing program 618 rewrites "failed" as the resource state 657 of the recovery resource in the server configuration information 650 with "normal". In S740, the post-recovery processing program 618 initializes the use history 694 corresponding to the recovery resource ID in the resource use history information 690, and updates the allocated amount 695. For example, when the recovery resource is a flash device, the number of times the writing is performed in the use history 694 is initialized. In S750, the post-recovery processing program 618 starts the upper limit value exceeding check program 616, and this flow is terminated. Thus, the resource amount based on the failed resource is subtracted from the destruction amount of corresponding to the resource type of the failed resource. When the upper limit value exceeding information 684 in the destruction amount upper limit value information 680 changes from Yes to No due to the operation of the upper limit value exceeding check program 616, the post-recovery processing program 618 may notify the tenant user of information indicating that the resource can be allocated.

With the post-recovery processing program 618 described above, the management server 100 can update the use history of the resource in accordance with the replacement of the failed resource. When the failed resource is allocated to the LPAR of the tenant, the use history of the failed resource is initialized. Thus, the resource amount used by the tenant may change from the state of exceeding the destruction amount upper limit value set in advance, to a state of not exceeding the destruction amount upper limit value. Thus, a new resource can be applied to the LPAR of the tenant.

FIG. 17 illustrates an input screen.

The resource state input program 621 causes the input/output device of the management server 100 or the display computer 400 to display the resource state input screen, in response to an operation on the management server 100 or the display computer 400 by the overall administrator, and receives an input from the overall administrator. The resource state input screen includes resource state information 710, a failure button 721, a recovery button 722, and an allocation cancel flag 723.

The resource state input program 621 generates the resource state information 710 based on the server configuration information 650 and the LPAR configuration information 660. The resource state information 710 includes an entry for each resource. The entry for one resource includes a designation flag (#) 711, a resource 712, an allocation destination LPAR 713, an LPAR operating state 714, a physical server information 715, and a resource state 716. The designation flag 711 is a checkbox. The resource is designated as a designated resource when the checkbox is checked. The resource 712 is a resource ID indicating the resource and is based on the resource ID 655 of the server configuration information 650. The allocation destination LPAR 713 is an LPAR-ID indicating the LPAR as the allocation destination of the resource, and is based on the LPAR-ID 661 in the LPAR configuration information 660. The LPAR operating state 714 indicates whether or not the LPAR is operating or in standby, and is based on the LPAR operating state 663 in the LPAR configuration information 660. The physical server information 715 indicates a physical server ID of the physical server 200 including the resource, and is based on the physical server ID 651 in the server configuration information 650. The resource state 716 indicates whether or not the resource is normal or failed, and is based on the resource state 657 in the server configuration information 650.

The affected physical server and the management server 100 might not be able to identify the failed resource immediately after the failure occurs, and the failed resource might be identified by a subsequently executed cause analysis. When the failed resource is identified by the cause analysis, or when the management server 100 has not received the failure alert from the physical server 200 but the overall administrator has determined that the resource has failed, the overall administrator may set the failed resource with the resource state input screen. When the failure button 721 is pressed in a state where the designated resource has been designated with the designation flag 711, the resource state input program 621 changes the resource state 657 of the designated resource in the server configuration information 650 to "failed". Here, the resource state input program 621 may distinguish the failure input through the resource state input screen from the failure detected by the physical server 200. For example, the resource state input program 621 rewrites the resource state 657 in the server configuration information 650 with "failed (manual)" for the failure input with the resource state input screen.

When the failure button 721 is pressed, the failure detection program 611 executes processing that is the same as that in the case where the failure alert is received. Thus, the resource state input program 621 that has received information indicating that the failure button 721 has been pressed may request the physical server 200, corresponding to the designated resource, to transmit a pseudo failure alert to the management server 100.

When the management server 100 has not received the recovery alert from the physical server 200, and when the overall administrator has determined to perform the resource recovery or implemented input of failure using the resource state input screen but wishes to restore the state to normal, the overall administrator can set the recovery resource with the resource state input screen. When the recovery button 722 is pressed in a state where the designated resource has been designated with the designation flag 711, the resource state input program 621 changes the resource state 657 of the designated resource in the server configuration information 650 to "normal".

When the recovery button 722 is pressed, the post-recovery processing program 618 executes processing that is the same as that in the case where the recovery alert is received. Thus, the resource state input program 621 that has received information indicating that the recovery button 722 has been pressed may request the physical server 200, corresponding to the designated resource, to transmit the pseudo recovery alert to the management server 100.

The allocation cancel flag 723 is used for setting whether or not to immediately execute allocation cancelation (real-location execution). The management server 100 restarts the LPAR when the failure button 721 or the recovery button 722 has been pressed, the LPAR needs to be restarted for allocation cancelation of the failed resource or reallocation, and the allocation cancel flag 723 is effective. When the LPAR needs to be restarted and the allocation cancel flag 723 is ineffective, the overall administrator manually shuts down the LPAR. The management server 100 performs an operation, performed in a case where the failure alert or the recovery alert is received for all the corresponding LPARs to which the designated resource is allocated, when the LPAR operating state 663 in the LPAR configuration information 660 is standby. The allocation cancel flag 723 may be omitted. In this case, the LPAR is restarted with a method set in advance.

With the resource state input program 621 described above, the resource state input screen displays information as a topology such as the allocation destination LPAR 713 and the physical server information 715 as well as the LPAR operating state 714 and the resource state 716, to help the overall administrator for making the determination, whereby false determination can be prevented. The management server 100 can operate in a manner that is the same as that in case where the physical server 200 detects the failure or the recovery, even when the overall administrator manually sets the failure or the recovery.

Figure 18:
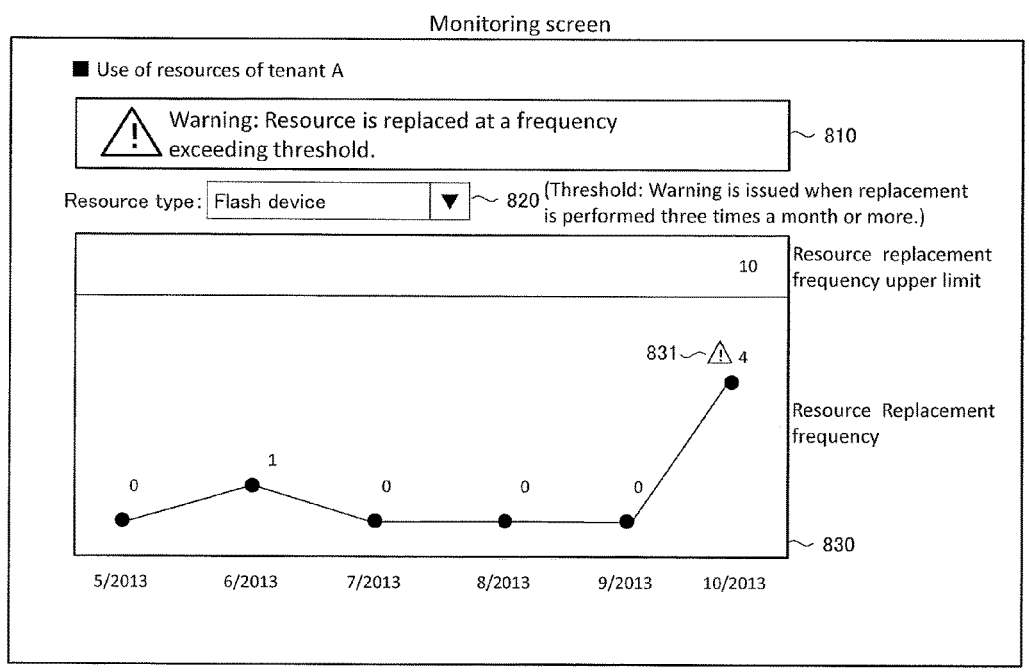
FIG. 18 illustrates a monitoring screen.

FIG. 18 illustrates a monitoring screen.

The monitor image output program 622 causes the input/output device of the management server 100 or the display computer 400 to display a monitoring screen, in accordance with an operation on the management server 100 or the display computer 400 made by the overall administrator or a tenant user of a specific tenant. The monitoring screen is an interface for displaying information such as monitoring and alert to the overall administrator or the tenant user, based on the information held by the management server 100. The tenant user can only view information related to the own tenant. The monitoring screen includes an alert display portion 810, a resource type designating portion 820, and a monitoring display portion 830.

The resource type designating portion 820 receives a selection of the resource type by the tenant user, and the resource type thus selected is set as a selected resource type.

The monitoring display portion 830 displays the number of times the replacement has been performed by the tenant for a selected resource type, in each unit time set in advance. In the monitoring display portion 830, a horizontal axis represents time, and a vertical axis represents the number of replace times. The monitoring display portion 830 further displays a replace time upper limit value on the vertical axis. The number of replace times and the replace time threshold represent the number of times a new resource is allocated to the tenant due to the failure of the resource of the selected resource type. The destruction amount may be used instead of the number of replace times. The number of replace times upper limit value of the selected resource type of the tenant is a value obtained by dividing the destruction amount upper limit value by the allocated amount, for example. When the number of replace times in the unit time is not less than the number of replace time threshold, the monitoring display portion 830 displays a warning mark 831. The monitoring screen may display information indicating how many times the replacing can be performed for the selected resource type before the number of replace times upper limit value is exceeded.

The alert display portion 810 displays an alert to the overall administrator or the tenant user. For example, the alert display portion 810 displays the alert when a calculated value for the tenant and a specific resource type exceeds an alert threshold set in advance in the unit time. The monitor image output program 622 can set the alert threshold and an alert notification based on an input from the overall administrator or the tenant user. The tenant user can perform the setting only for the own tenant. The calculated value is, for example, a resource replacement frequency and the number of remaining resource replaceable times. The resource replacement frequency represents the number of times a new resource is allocated to the tenant due to the failure in the unit time, for a specific resource type. The number of remaining resource replaceable times is a value obtained by subtracting the destruction amount from the destruction amount upper limit value, and indicates how much resource amount can be allocated before the destruction amount upper limit value is exceeded. Alternatively, the remaining resource replaceable times is a value obtained by subtracting the number of replace times from the number of replace times upper limit value, and indicates how many times the resource amount can be allocated before the number of replace times upper limit value is exceeded.

An example of the alert is described. When the resource replacement frequency of a certain tenant exceeds the alert threshold set by the overall administrator, the alert display portion 810 displays a question asking the tenant user to transmit alert, or a question asking whether or not to inhibit the resource replacement for the tenant. Thus, the monitor image output program 622 transmits the alert to the tenant user when the overall administrator inputs the transmission instruction, and executes processing of setting Yes as the upper limit value exceeding information 684 of the tenant when the resource replacement inhibition instruction is input from the overall administrator. When the resource replacement frequency of a certain tenant exceeds the alert threshold set by the overall administrator or the tenant user of the tenant, the alert display portion 810 displays a message indicating that whether or not the system in operation has no problem needs to be checked. Furthermore, the alert display portion 810 displays a message indicating whether or not the performance of the CPU is insufficient for the system in operation or that whether or not load is excessively applied to the flash device needs to be checked. When the destruction amount of a certain tenant almost reaches or has reached the destruction amount upper limit value, a message indicating the remaining resource replaceable times, indicating that the resource cannot be replaced any further, or indicating that the destruction amount upper limit value can be increased by switching to a higher level service is displayed.

With the monitor image output program 622 described above, the overall administrator or the tenant user can check a state to see whether the tenant is stably operating, whether there is a sudden change, whether the destruction amount or the number of replace times has not reached the upper limit value, and the like.

FIG. 19 illustrates a destruction amount upper limit value input screen.

The destruction amount upper limit value input program 623 causes the input/output device of the management server 100 or the display computer 400 to display the destruction amount upper limit value input screen in accordance with an operation on the management server 100 or the display computer 400 by the overall administrator, and receives an input from the overall administrator. Thus, the destruction amount upper limit value input program 623 generates the destruction amount upper limit value information 680. The destruction amount upper limit value input program 623 may acquire the destruction amount upper limit value information 680 that has been collectively input as a file based on a template, without using the destruction amount upper limit value input screen. The destruction amount upper limit value input screen includes a destruction amount upper limit value information 910, an apply button 921, and a cancel button 922.

The destruction amount upper limit value information 910 includes a tenant ID 911, a resource type 912, and a destruction amount upper limit value 913. The destruction amount upper limit value information 910 includes entries for all the tenants and all the resource types. The tenant ID 911 indicates an identifier of a tenant. The resource type 912 indicates a resource type. The destruction amount upper limit value 913 is represented by a setting value and a unit. The overall administrator can input the setting value and select the unit in the destruction amount upper limit value 913.

When the apply button 921 is pressed, because of the destruction amount upper limit value input program 623, the content of an input to the destruction amount upper limit value information 910 is reflected on the destruction amount upper limit value information 680. When the cancel button 922 is pressed, the destruction amount upper limit value input program 623 discards the content input to the destruction amount upper limit value information 910.

With the destruction amount upper limit value input program 623 described above, the overall administrator can set the destruction amount upper limit value for each resource type, based on a contract with the tenant user.

When the physical server 200 detects a predictor of the failure, the failure alert may be transmitted to the management server 100, as in the case of the failure, to be processed by the failure detection program 611. For example, the physical server 200 sets a failure predictor threshold lower than the number of writing times threshold representing the service life of the flash device, and transmits the failure alert to the management server 100 when the number of writing times exceeds the failure predictor threshold. Thus, the management server 100 can process the failure predictor in the same manner as that for the failure.

The LPAR and the VM in the present embodiment can be regarded as virtual computers different from each other in layers. The hypervisor may be used instead of the logical dividing mechanism. In this case, the physical server 200 implements the hypervisor, and the hypervisor implements a plurality of VMs. The hypervisor may have a hierarchy. The LPAR may run the OS. In this case, the LPAR migration processing is executed instead of the VM migration processing. The computer system may include a single tenant.

The order in which the program execute the processing is replaceable. For example, an order of the processing executed in S260 to S370 by the failure addressing program 614 may be replaced with an order of the processing executed in S380 by the failure addressing program 614.

Terms used for the description of the present invention are described. A management computer corresponds to the management server 100 and the like. A memory corresponds to the memory 110 and the like. A network interface corresponds to the NIC 130 and the like. A processor corresponds to the CPU 120 and the like. A display apparatus and an input apparatus correspond to the input/output device 140, the display computer 400, or the like. A physical computer corresponds to the physical server 200 and the like. A virtual computer corresponds to the LPAR, the VM, and the like.

The user corresponds to the tenant and the like. Corresponding information corresponds to the configuration information 630, the tenant information 640, and the like. An upper limit value corresponds to the destruction amount upper limit value and the like. Failure information corresponds to the failure alert, the information indicating that the failure button 721 has been pressed, and the like. Recovery information corresponds to the recovery alert, the information indicating that the recovery button 722 has been pressed, and the like. A non-volatile semiconductor memory corresponds to the flash devices 250 and the like. An input screen corresponds to the resource state input screen and the like. In formation based on a destruction amount corresponds to the number of replace times, the destruction amount, the resource replacement frequency, the remaining resource replaceable times, the alert to the overall administrator or the tenant user, and the like.

The present invention is not limited to the embodiment described above and may be modified in various ways without departing from the gist of the present invention.

REFERENCE SIGNS LIST

100 Management server
110 Memory
120 CPU
130 NIC
140 Input/output device
200 Physical server
230 Memory
240 CPU
250 Flash device
260 Memory
280 Logical dividing mechanism
300 Disk array apparatus
400 Display computer
610 Management program
630 Configuration information
640 Tenant information

The invention claimed is:

1. A management computer comprising:
a memory;
a network interface coupled to a plurality of physical computers; and
a processor coupled to the memory and the network interface, wherein
the memory is configured to:
store association information indicating an association among a first physical computer that is in the plurality of physical computers, a virtual computer that is implemented by the first physical computer, a first physical resource that is in the first physical computer and allocated to the virtual computer, and a user who uses the virtual computer,
store failure information indicating a failed physical resource, and
store an upper limit value for a destruction amount being an amount of a physical resource that is of the same type as the first physical resource and that has failed by being used by the user, and
the processor is configured to:
calculate the destruction amount based on the association information and the failure information,
determine whether or not the destruction amount is equal to or less than the upper limit value,
determine based on the failure information whether or not the first physical resource fails,
determine, upon determining that the first physical resource fails and that the destruction amount is equal to or less than the upper limit value, based on the association information whether or not any of the plurality of physical computers includes a second physical resource that is usable as a replacement for the first physical resource, and
transmit, upon determining that any of the plurality of physical computers includes the second physical resource, to the first physical computer an instruction to allocate the second physical resource to the virtual computer as a replacement for the first physical resource, and
wherein the processor causes a display apparatus to display information based on the destruction amount.

2. The management computer according to claim 1, wherein
upon determining that the first physical resource fails and the destruction amount is equal to or less than the upper limit value, the processor determines whether or not the first physical computer includes the second physical resource based on the association information, and
upon determining that the first physical computer includes the second physical resource, the processor transmits to the first physical computer the instruction to allocate the second physical resource to the virtual computer as a replacement for the first physical resource.

3. The management computer according to claim 2, wherein
upon determining that the first physical resource fails, that the destruction amount is equal to or less than the upper limit value, and that the first physical computer does not include the second physical resource, the processor determines based on the association information whether or not any of the plurality of physical computers other than the first physical computer includes an alternative physical resource group that includes the second physical resource and that is equivalent to a physical resource group allocated to the virtual computer and including the first physical resource, and
upon determining that any of the plurality of physical computers other than the first physical computer includes the alternative physical resource group, the processor transmits to the first physical computer and the second physical computer an instruction to allocate the alternative physical resource group to the virtual computer, migrate the virtual computer from the first physical computer to a second physical computer including the alternative physical resource group, and release the physical resource group from the virtual computer.

4. The management computer according to claim 3, wherein
the memory is configured to store a history of use of the first physical resource by each of a plurality of users, and
the processor is configured to calculate the destruction amount for each of the plurality of users by distributing an amount of the first physical resource to the plurality of users based on the history of use of the first physical resource by the plurality of users.

5. The management computer according to claim 4, wherein
when the type is a non-volatile semiconductor memory, the processor receives from the first physical computer the number of times of writing on the non-volatile semiconductor memory by the virtual computer, and stores in the memory the number as the history of use.

6. The management computer according to claim 5, wherein when the type is not the non-volatile semiconductor memory, the processor stores in the memory, as the history of use, the amount of the first physical resource allocated to the virtual computer.

7. The management computer according to claim 6, wherein the virtual computer is a first logical partition created by logical partitioning of the first physical computer, the association information indicates a Virtual Machine (VM) executed by the first logical partition, upon determining that the destruction amount is larger than the upper limit value, the processor determines based on the association information whether or not any of the plurality of physical computers creates a second logical partition that is used by the user and that is able to execute the VM, and upon determining that the second logical partition is created, the processor transmits to the first physical computer an instruction to migrate the VM from the first logical partition to the second logical partition.

8. The management computer according to claim 7, wherein upon determining that the first physical resource fails, that the destruction amount is not larger than the upper limit value, that the first physical computer does not include the second physical resource, and that the alternative physical resource group does not exist, the processor determines based on the association information whether or not the second logical partition is created, and upon determining that the second logical partition is created, the processor transmits to the first physical computer an instruction to migrate the VM from the first logical partition to the second logical partition.

9. The management computer according to claim 4, wherein upon receiving recovery information indicating that the first physical resource is recovered, the processor subtracts an amount based on the first physical resource from the destruction amount, and determines whether or not the destruction amount is equal to or less than the upper limit value.

10. The management computer according to claim 1, wherein when the first physical resource fails, the failure information is transmitted from the first physical computer to the processor, and the processor is configured to receive the failure information from the first physical computer.

11. The management computer according to claim 10, wherein the processor is configured to cause a display apparatus to display an input screen through which the failure information is input, the failure information is input to an input apparatus in accordance with the display, and the processor is configured to receive the failure information from the input apparatus.

12. The management computer according to claim 8, wherein upon determining that the first physical resource fails, that the destruction amount is larger than the upper limit value, and that the second logical partition is not created, or upon determining that the destruction amount is equal to or less than the upper limit value, that the first physical computer does not include the second physical resource, that the alternative physical resource group does not exist, and that the second logical partition is not created, the processor transmits to the first physical computer an instruction to shut down the first logical partition.

13. The management computer according to claim 4, wherein the processor calculates the destruction amount by adding an amount of the first physical resource distributed to the user to an amount of a physical resource which is of the type of one of the physical resource group and which is different from the first physical resource.

* * * * *